(12) United States Patent
Blackmore et al.

(10) Patent No.: US 7,517,212 B2
(45) Date of Patent: Apr. 14, 2009

(54) PORTABLE PIPE REPAIR SYSTEM WITH ELECTRICALLY HEATED POSITIONING MEMBER

(75) Inventors: Richard Blackmore, Houston, TX (US); John Perry Nixon, Katy, TX (US); William Lepola, Magnolia, TX (US)

(73) Assignee: Energy Mainteance Services Group I, LLC, Houston, TX (US)

( * ) Notice: Subject to any disclaimer, the term of this patent is extended or adjusted under 35 U.S.C. 154(b) by 410 days.

(21) Appl. No.: 11/174,188

(22) Filed: Jul. 1, 2005
(Under 37 CFR 1.47)

(65) Prior Publication Data
US 2006/0048832 A1     Mar. 9, 2006

Related U.S. Application Data

(60) Provisional application No. 60/585,067, filed on Jul. 1, 2004, provisional application No. 60/642,951, filed on Jan. 11, 2005.

(51) Int. Cl.
 *B29C 73/00* (2006.01)
 *B32B 43/00* (2006.01)
(52) U.S. Cl. .................... 425/460; 138/97; 156/287; 405/150.1; 405/184.2; 264/36.17; 425/13
(58) Field of Classification Search .................. 138/97, 138/98; 425/13, 392, 460; 264/36.17; 219/243; 156/94, 156, 287; 405/405.1, 184.2
See application file for complete search history.

(56) References Cited

U.S. PATENT DOCUMENTS

| | | | | |
|---|---|---|---|---|
| 4,077,610 | A * | 3/1978 | Masuda | 254/134.4 |
| 4,668,125 | A * | 5/1987 | Long, Jr. | 405/184.2 |
| 5,309,947 | A * | 5/1994 | Hinger | 138/98 |
| 5,589,131 | A * | 12/1996 | Steketee, Jr. | 264/568 |
| 5,937,910 | A * | 8/1999 | Chandler | 138/97 |
| 6,390,795 | B1 * | 5/2002 | Waring et al. | 425/11 |
| 6,960,313 | B2 * | 11/2005 | Waring et al. | 264/36.17 |
| 7,000,643 | B2 * | 2/2006 | St. Onge et al. | 138/98 |
| 7,073,536 | B2 * | 7/2006 | Blackmore et al. | 138/98 |
| 7,306,693 | B2 * | 12/2007 | Weatherby et al. | 156/293 |
| 2005/0072482 | A1* | 4/2005 | Harrington | 138/97 |
| 2005/0098909 | A1* | 5/2005 | Kiest, Jr. | 264/36.17 |
| 2006/0070676 | A1* | 4/2006 | Blackmore, Jr. | 138/98 |
| 2006/0151037 | A1* | 7/2006 | Lepola et al. | 138/98 |
| 2006/0159791 | A1* | 7/2006 | Kamiyama et al. | 425/11 |
| 2006/0174957 | A1* | 8/2006 | Blackmore et al. | 138/98 |
| 2006/0197262 | A1* | 9/2006 | Waring | 264/516 |
| 2007/0204952 | A1* | 9/2007 | Driver et al. | 156/203 |
| 2008/0029177 | A1* | 2/2008 | Kamiyama et al. | 138/98 |

* cited by examiner

*Primary Examiner*—Yogendra Gupta
*Assistant Examiner*—Emmanuel S Luk
(74) *Attorney, Agent, or Firm*—David McEwing

(57) ABSTRACT

A method and device is disclosed for inserting a flexible, inflatable and electrically heatable bladder conveying and installing a thermally responsive repair material into the interior of a pipe. The device is portable and can be used to repair pipe accessible from only one location.

27 Claims, 17 Drawing Sheets

STEP 5

STEP 6

STEP 7

PORTABLE PIPE REPAIR SYSTEM WITH ELECTRICALLY HEATED POSITIONING MEMBER

RELATED APPLICATION

This application claims priority to provisional application 60/585,067 filed Jul. 1, 2004 and entitled "Portable Pipe Repair System with Electrically Heated Positioning Member" and provisional application 60/642,951 filed Jan. 11, 2005 entitled "Canister Claim Shell and Spool.

BACKGROUND OF INVENTION

1. Field of Invention

The present invention generally relates to an apparatus and method for the installation of a repair material within a conduit or pipe such as a sanitary sewer line. More specifically, the invention pertains to an apparatus and method for the installation of a repair material controlled from a remote location using fluid pressure and electrically resistive or impedance heating to deploy, form and cure the repair material to the inside surface of a pipe.

2. Description of Related Art

It is generally accepted that the aging infrastructure worldwide is fast approaching originally designated design lives. Specifically, pipes and conduits located both above and below ground employed in the conveyance of liquids frequently require repair to prevent leakage into or from the pipe system. The cause of leakage can vary from improper installation to environmental conditions to normal aging or the detrimental effects of the substances transported on the pipe materials. Regardless of the cause, leakage is undesirable.

Because of the high costs and the level of difficulty involved in excavating or removing and replacing leaking conduits, various methods have been devised for insitu repair. These methods have minimized the expense and hazards associated with digging and replacing defective pipes.

In the conventional processes for the insitu rehabilitation of existing pipes and conduits, a flexible tubular liner impregnated with a thermosetting synthetic resin matrix is introduced into the conduit using an inverting process as well know to one skilled in the art. In U.S. Pat. No. 05,108,533, the flexible tubular liner is comprised of a needle-punched felt material.

Once the liner is positioned within the pipeline, the liner is pressurized internally using a fluid pressure such as air or water to force the lining material into intimate contact with the pipe interior and provide compaction. Adding heat in the form of hot water, steam or electrical energy can then cure the resin matrix. The latter method of providing heat by electrical energy is disclosed in U.S. Pat. No. 5,606,997. Once the resin is cured, the resultant material forms a hard, tight fitting lining within the pipe that also serves to provide added structural support.

Only several processes are known that address in situ repair of pipe wall. One such process is described in U.S. Pat. No. 5,223,189 for repair of the interface between two pipes, such as sewer main line and an intersecting lateral line, wherein a thermoplastic sealing material is installed into the a pipe by means of a robotic device and an expandable mandrel. This method relies on a heat formed seal being produced between the repair material and a pipe. In U.S. Pat. No. 5,950,682, a resin absorbent material, impregnated with a hardening resin matrix, is positioned within the mainline pipe and provides a means for inverting a section of like material into the lateral pipe for a pre-determined distance. Some of these techniques require access to the pipe interior from two spaced locations. This is not often possible.

In addition, because these processes use a resin matrix that is expected to fully cross-link or cure in an undesirable environment (i.e. hot, cold, wet, etc), catalysts, initiators and even inhibitors are added to the resin system in an attempt to control the curing mechanism. This has resulted in many failures due to premature curing of the resin, inadequate resin cross-linking and shrinkage. In addition, because the resin is applied to the repair material at the installation site (and typically in uncontrolled conditions), inconsistencies in resin content or mixing procedures, inadequate resin distribution within the repair material, and premature resin curing can be expected. Other methods have been disclosed that use an auxiliary curing source unlike the typical systems that rely solely on ambient temperatures to effect a cure. Radiant energy in the form of ultraviolet light, as in U.S. Pat. No. 5,915,419, or visible light, as disclosed in U.S. Pat. No. 4,518,247 have been employed to provide a curing mechanism for lateral interface sealing systems. The shortcomings of these types of systems lay in the difficulty of the prescribed radiant light source to penetrate through the thickness of the repair material and the overall fragility of such devices.

Therefor, it is desirable to provide a system to overcome the constraints mentioned above and also afford a fast, consistent repair method that enables robust, cost effective in situ repair of pipe walls.

BRIEF SUMMARY OF THE INVENTION

The present invention generally relates to an apparatus and method for installing a repair material within an existing pipeline or conduit. The method teaches in situ repairing of a pipe or conduit (hereinafter "pipe") by applying a thermally responsive repair material to the interior wall surface utilizing a flexible positioning bladder containing heating components. The method includes deploying the bladder and repair material from a stowed wound position within in a portable launching component (hereinafter "container" or "canister"). The canister is fluid sealable and includes at least one opening. The bladder heating components are in communication with an electrical power source. The apparatus also includes controllable fluid pressure components for deploying the bladder from the canister and into the interior of the pipe. The apparatus may also include the capability of radially expanding the deployed bladder to press against the interior pipe wall surface.

The features and advantages of the present invention will be apparent from the following description taken in conjunction with the accompanying drawings, which illustrate, by way of example, the principles of the invention. The scope of the invention however, is not limited to this description. Other benefits of the invention will also become apparent to those skilled in the art and such advantages and benefits are included within the scope of this invention.

BRIEF SUMMARY OF DRAWINGS

FIG. 16B illustrates the downward pressure when the cover is twisted to the sealed position.

Figure 1A:
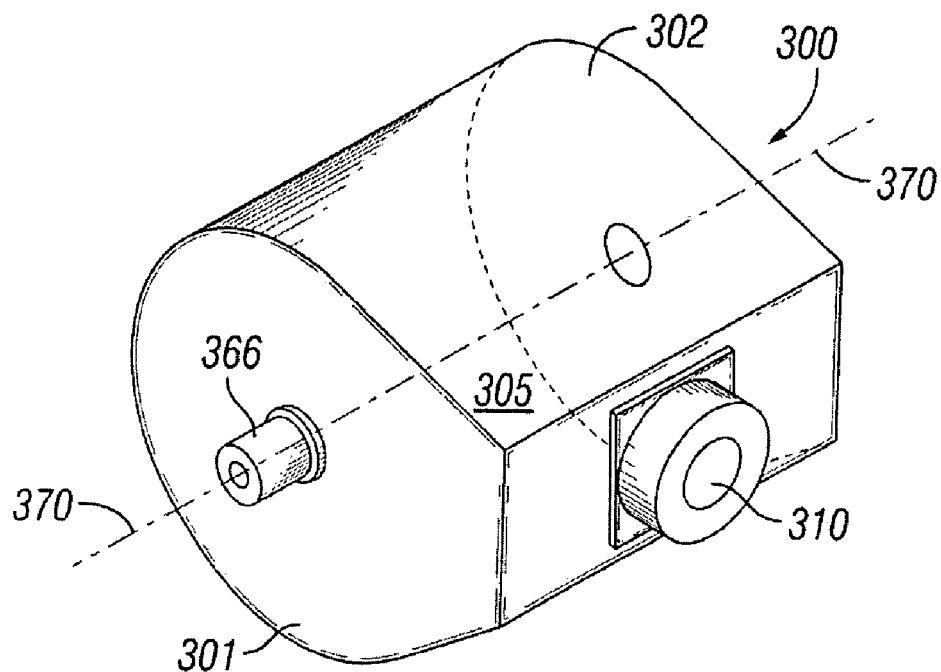
FIG. 1A illustrates a prospective view of the canister subjection of the invention, including the canister annulus, the bladder deployment port, the rotating/pivoting mechanism and axis of rotation.

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF INVENTION

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated. The above general description and the following detailed description are merely illustrative of the subject invention and additional modes, advantages and particulars of this invention will be readily suggested to those skilled in the art without departing from the spirit and scope of the invention.

The invention teaches a device having a canister component and a bladder component. (The canister may also be termed a "container".) The canister provides storage, transportation and deployment of a flexible, heatable and inflatable bladder. The canister is fluid sealable and contains at least one opening through which the bladder may be deployed ("bladder deployment port").

The bladder component comprises a fluid inflatable bladder having a cylindrical or tubular shape that is closed at one end ("first end") and open at a second end ("second end"). The bladder has an interior wall surface and an exterior wall surface and forms an interior annulus. The bladder walls are sufficiently flexible to allow the bladder to be inverted (turned inside out like a sock) and everted (turned right side out). The bladder can detachably carry a pipe liner or pipe repair material on the exterior surface. The bladder component may also include the capability of radially expanding the bladder diameter when fluid inflated to press the repair material to the interior pipe wall surface. This radial expansion can be controlled by fluid pressure.

The bladder incorporates an electrically conductive component located within the bladder walls that, when energized with electric current, can create impedance or resistive heat (hereinafter "resistive heating"). The bladder includes electrically conductive wires and connectors that can be connected to counter part electrically conductive components within the canister. These components can form an electric circuit when attached to a power source.

The bladder also includes a sub-component to attach an elongated tether component to the inside bladder wall proximate to the closed bladder first end. The tether component has an attachable first end and an attachable second end. The second tether end can be attached to a rotating component (spool or spindle) within the canister. The second open end of the bladder can be sealably attached to an opening of the canister component (bladder deployment port).

The bladder may also include a tether connecting device proximate to the exterior of the first closed end. When there are two points of access to the pipe, a "guide" tether or "control" tether can be first deployed and used to provide a pulling force on the bladder as it everts from the canister and deployed into the pipe. This can be especially beneficial when the pipe has multiple turns and bends.

When the bladder is extended out of the canister, pipe repair or liner material can be placed on the exterior bladder surface. The repair material can be flexible fibrous material containing heat reactive or heat responsive resin or polymer, either thermal setting or thermal plastic (hereinafter "thermal responsive"). The resin can be applied to the repair material after the material is placed on the bladder or the repair material can be pre-impregnated.

The canister component, like the bladder, is fluid sealable. The canister is not expandable and maintains a rigid or fixed volume. The interior of the canister (hereinafter "annulus") can be placed in fluid communication with an external fluid pressure or fluid vacuum source (hereinafter "fluid source").

The canister annulus contains a rotatable spindle sub-component in communication with a rotating control mechanism outside the canister. The spindle may be used with a removable spool or it can be used alone. The spindle or spool also has a mechanism to attach the second tether end.

The canister also contains an opening ("bladder deployment port") dimensioned to allow the bladder to pass through to be wound on the spindle or spool. When the annulus is pressurized, the bladder can also be deployed out through the opening.

The bladder can be pulled into the canister and spooled on the spindle by rotating the spindle and first spooling the tether and then the inverted first closed end of the bladder. In this manner, the flexible bladder operates like a sock being turned inside out. The length of the bladder can thus be inverted and pulled into the canister and wound on the rotating spindle (or spool attached to the spindle). The spindle can be controlled and rotated from the exterior of the canister by use of a hand wheel or by mechanically powered component.

The canister opening also contains mechanisms for sealably attaching the second open end of the bladder at the bladder deployment port. It will be appreciated that the bladder annulus and canister annulus are to be in fluid sealed communication.

The bladder may contain other fluid sealable openings for accessing the interior annulus or viewing the operation of the spindle and winding and unwinding of the tether and bladder. Accessing the interior annulus can be for loading a pre-wound bladder on a spool into the canister and attaching it to the spindle component. The canister also contains an electrical power sub-component to convey electrical current from a power source to the electrically conductive components of the bladder.

It will be readily appreciated that differing sized or lengths of bladder may be stored on spools that may be removed from the canister. In other embodiments, repair material can be installed on an extended bladder that is then inverted, pulled through the bladder deployment port, and spooled for later use and stored in a controlled environment to minimize premature curing of resin. Multiple assemblies can be prepared for later use as needed. The environmental controls can include lowered temperature, thereby retarding the curing of the resin. The controls can also achieve more uniform dispersion of the thermally responsive matrix within the repair material.

In the preferred embodiment, the bladder is comprised of an inner layer of a material such as silicone, being fluid impermeable and non-electrically conductive. This layer is also preferably is a relatively poor thermal conductor. The bladder next comprises a layer of electrically conductive material such as carbon or graphite fibers or filaments. The fibers may be braided or knitted in a tubular design and extend through substantially the complete length of the bladder. At least one electrically conductive wire is attached to the electrically conductive layer, e.g. carbon fiber layer, proximate to the first closed end. The next layer, exterior or outer layer, is preferably a relatively good thermal conductor relative to the first inner layer. In the preferred embodiment of the invention, this layer is also comprised of silicone. As disclosed in this specification, the pipe repair material is carried on this outer layer. It will be appreciated that the carbon fiber layer is the source of electrical resistive heat. It is preferable that the thermal energy be readily transferred to the repair material containing thermally responsive resin.

FIG. 1 illustrates a perspective view of the canister 300 subject of the invention. The canister comprises a closeable container that is fluid sealable. Also illustrated is the internal annulus 305 that can hold a spool and wound bladder (not shown). The canister contains at least one opening 310 comprising the bladder deployment port. The external spindle mechanism 366 and the axis of rotation 370 are also illustrated.

In one embodiment of the canister, the canister comprises a bottom part 301 hingeably attached (not shown) to a top part 302. These two subcomponents can be hinged and fluid sealably attachable, thus forming a "clam-shell" type configuration. This design facilitates access to the annulus for installing and removing spool attachable to the rotatable spindle.

Figure 1B:
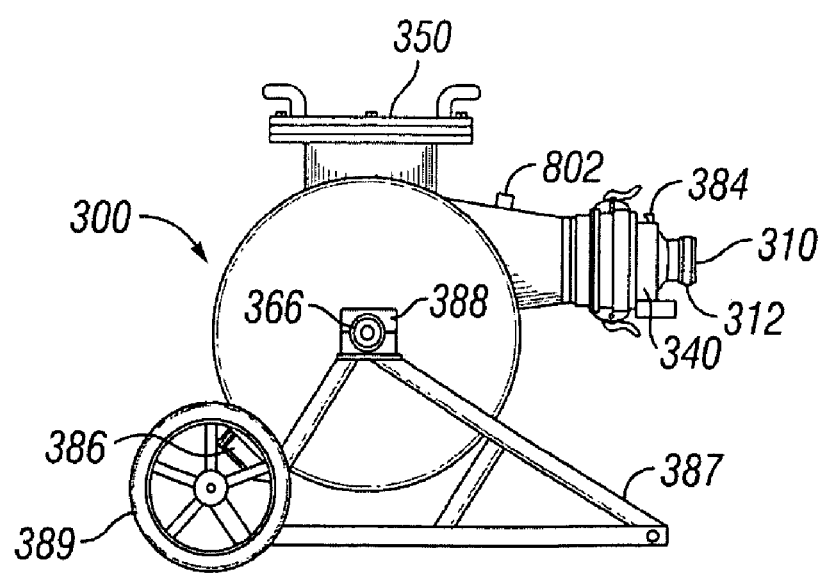
FIG. 1B illustrates a side view of the preferred embodiment of the invention, including the canister, the access/view port, the bladder deployment port, the canister support frame and wheels and pivoting mechanism.

FIG. 1B illustrates the preferred embodiment of the canister of the invention. This side view illustration shows the canister 300 and the bladder deployment port 310. The bladder deployment port has two subcomponents 312, 340 used in forming a fluid sealed connection of the second open bladder end and the canister annulus (not shown). The subcomponent 312 also is part of the electrically conductive connection ("open end electrical connector") between the bladder and an external power source. In the preferred embodiment, the open end electrical connector fits inside the outer connector ("outer connector") component 340 to the canister and held in place with at least one spring latch pin 384.

Also illustrated in FIG. 1B is the access/view port 350 of the canister and a controllable or fluid sealable connection 802 between the bladder annulus and an external fluid source. In the preferred embodiment of the canister, the access/view port forms a fluid seal by a twisting action onto the canister. This eliminates the use of multiple thumb screws or similar devices used to seal the covering of the view/access port. When in a closed and sealed position, a cotter pin or similar device can be inserted through aligned openings or indentations of the canister and covering. This subcomponent prevents the port covering from inadvertently being twisted to an "unsealed" position. When twisted to the unsealed position, the covering may be lifted from the canister, thereby permitting access into the canister annulus. (See FIGS. 15A&B, 16A&B and 17.)

In the preferred embodiment, the canister is also equipped with a fluid pressure rupture disk 386. This component serves as a fail safe fluid pressure relief mechanism.

The canister is held on a wheeled 389 frame support 387. The frame support includes a canister pivot mechanism 366 that allows the canister to rotate about an axis.

Figure 1C:
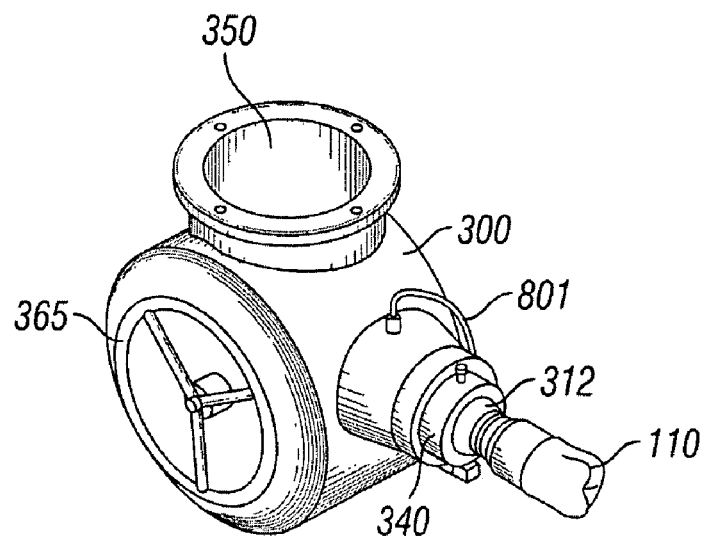

FIG. 1C is a perspective view of the preferred embodiment of the cansister 300. The components are illustrated with the same number sequence as in FIG. 1B. Also illustrated is an external spindle control wheel 365 (which in other embodiments is shown to be a crank) and a fluid supply or exhaust hose 801 connected to the fluid connection 802 to the canister annulus. A portion of the inverted bladder 110 is also illustrated extending from the bladder deployment port.

Figure 2A:
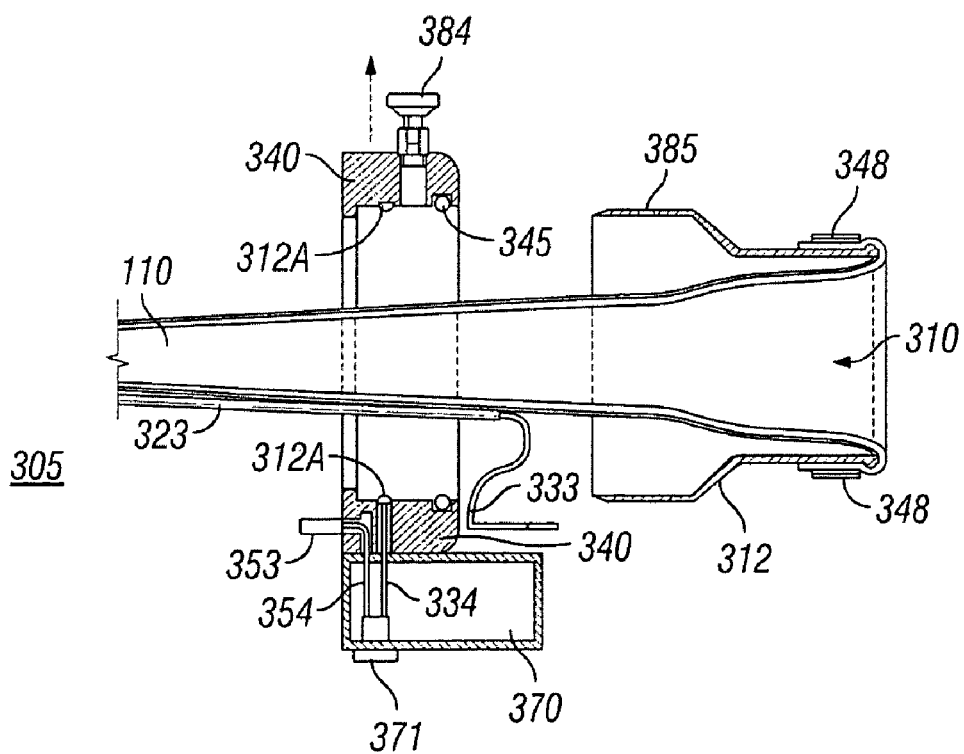
FIG. 2A illustrates an exploded side view of the components for the fluid sealable bladder deployment port of the preferred embodiment. Also illustrated is the second open end of the bladder attached to an electrically conductive component of the bladder deployment port and its orientation to the canister annulus.

FIG. 2A illustrates an "exploded" cross-sectional view of the bladder deployment port 310 of the preferred embodiment. The port comprises two components, the open end electrical connector 312 and the outer connector 340. Also illustrated is the spring latch pin 384 and counterpart latch pin opening 385. The outer connector and open end electrical connector seal with an o-ring 345.

The open end electrical connector is made of electrically conductive material such as a conductive metal. When inserted into the outer connector, the open end electrical connector makes electrically conductive contact with a counterpart electrical connector component 312A. This component is attached to a wire 334.

Also illustrated is an electrically conductive wire 333 that leads from the closed first end of the bladder (not shown) but contained within the bladder annulus 305. When the open end electrical connector is inserted within the outer connector, the wire is attached to a subcomponent 353 and wire 354. The electrically conductive wires 333-354, 334 from the closed first bladder end and the open second bladder end are attached to the electrical connecting component 371 within protective box 370. The external electrical connecting component can be attached to a separate electrical power source, thereby forming an electrical circuit with the conductive component of the bladder.

FIG. 2A also illustrates a portion of the bladder 110 folded over the outer surface of the open end electrical connector and held with a fluid sealed clamp 348. It will be appreciated that the electrically conductive layer or component of the bladder is in electrical contact with the open end electrical connector.

Figure 2B:
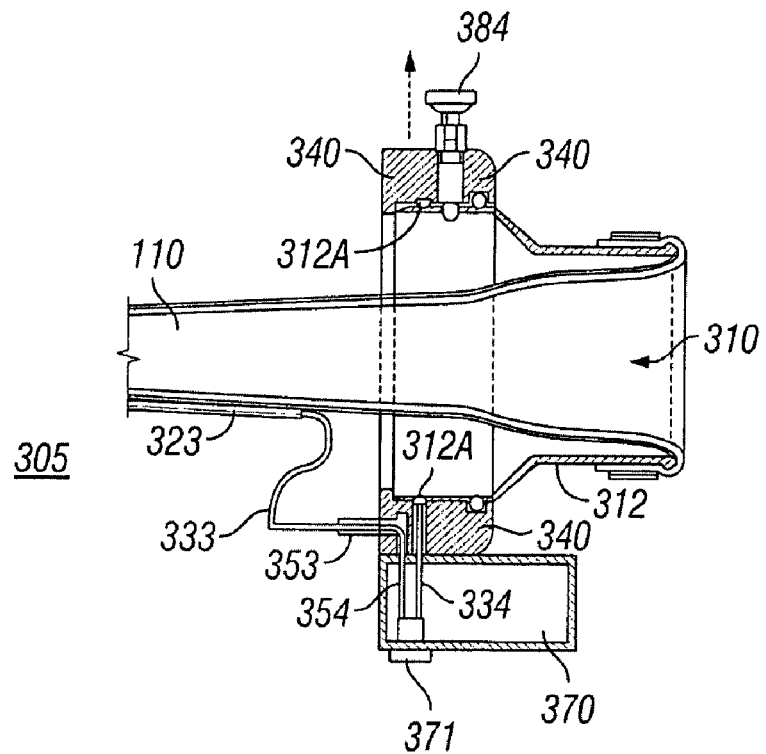
FIG. 2B illustrates the assembled components of the bladder deployment port, including the bladder, the electrically conductive wire from the first closed bladder end, the electrical connection components connectible to an electrical power source and locking pin for the assembly.

FIG. 2B illustrates the bladder deployment port and components in an assembled configuration. The components and subcomponents are as numbered in FIG. 2A.

Figure 3A:
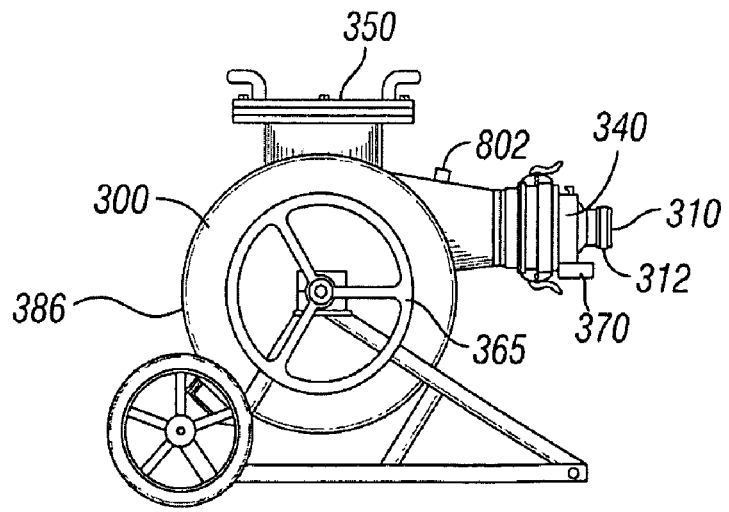
FIG. 3A illustrates another side view of the preferred embodiment, showing the external spindle control wheel.
Figure 3B:
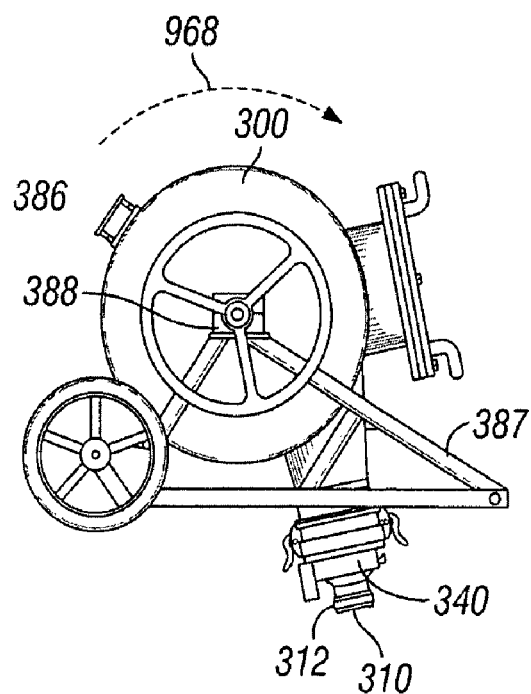
FIGS. 3B and 3C illustrate the pivoting movement of the canister and changed orientation of the bladder deployment port.
Figure 3C:
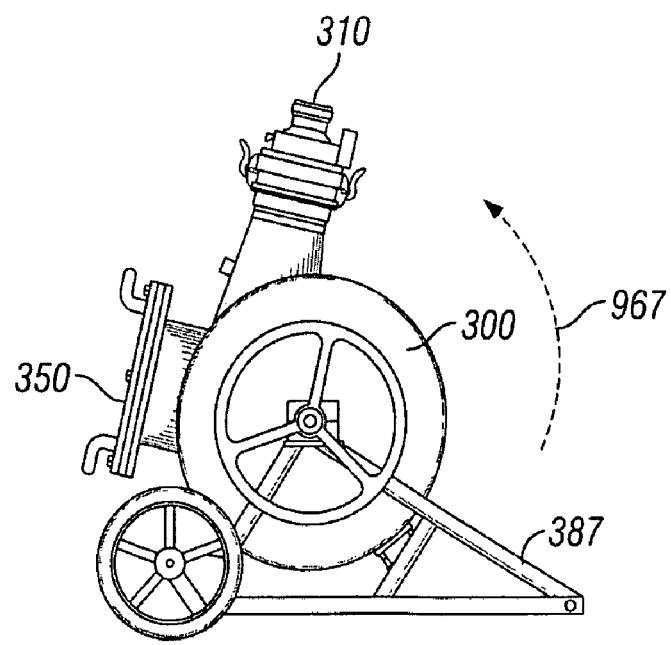

FIG. 3A is a side view illustration of the preferred embodiment of the invention also showing the external spindle wheel 365. FIGS. 3B and 3C illustrate the rotation of the canister (vector arrows 967, 968) permitting the orientation of the bladder deployment port to be changed. In one embodiment, the axis of canister rotation is aligned with the axis of spindle rotation.

Figure 4A:
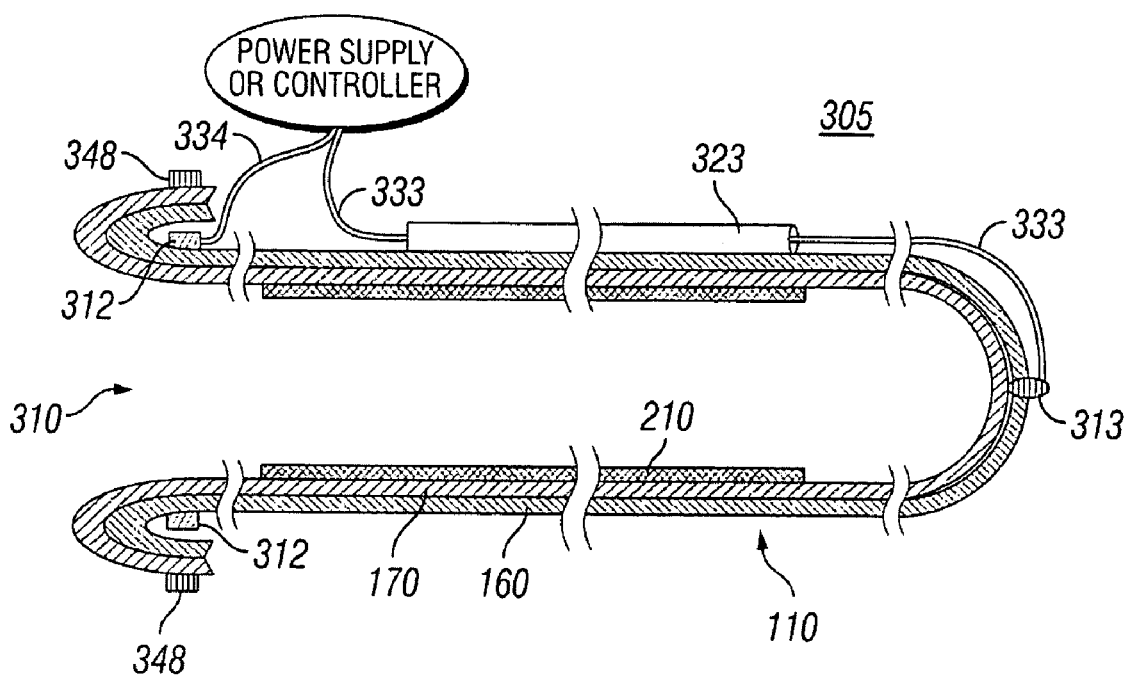
FIG. 4A illustrates a cross sectional view of the inverted bladder carrying repair material. Also illustrated are the electrically conductive components at the first closed end and the orientation of the inverted bladder to the canister annulus.

FIG. 4A illustrates a cross sectional view of the inverted (inside out) fluid inflatable bladder 110 as it may be wound onto a spool (not shown) within the canister annulus 305. It will be appreciated that the bladder is everted or turned right side out when deployed through the canister bladder deployment port (not shown) by action of increased fluid pressure within the fixed volume of the canister. The bladder comprises a first closed end 111 and a second open end 112. The bladder illustrated contains an electrically conductive layer 160 and a fluid inflatable (fluid impenetrable) layer 170 such as silicone. In the preferred embodiment, there is a second outer layer of silicone. The bladder can thereby be inflated with fluid pressure. The electrically conductive layer 160, when energized with electrical current from a power source via a controller, can create resistive heat. It will be appreciated that the electrically conductive material may be integral to the fluid impenetrable and expandable material provided the electrical contacts needed to form an electric circuit are maintained.

Also illustrated in FIG. 4A is a detachable repair material 210 that may be impregnated with a thermal setting resin. It is illustrated to be conveyed on the outer layer of the bladder. It will be appreciated that when deployed and inverted, the repair material will be on the outer surface of the bladder and may be pressed against the inner surface of a pipe by the fluid inflation of the bladder.

The bladder has a first closed end 111 and forms an elongated tubular structure. The opposing second open end 112 is fluid sealably attached to components 312 348 of the canister (not shown). The electrical conductive bladder layer 160 is in electrically conductive contact with an electrically conductive component 312 that is also in electrical communication with an electrical power source. The closed bladder end contains an electrical contact 313 in communication with an electrically conductive wire 333 also connected to the power source and thereby forming an electrically conductive circuit. In the preferred embodiment, the wire from the first closed end passes through a tubular protective device 323. A circular clamp 348 presses the electrically conductive layer 160 of the bladder 110 to the circular component 312 of the canister forming an electrical connection.

Figure 4B:
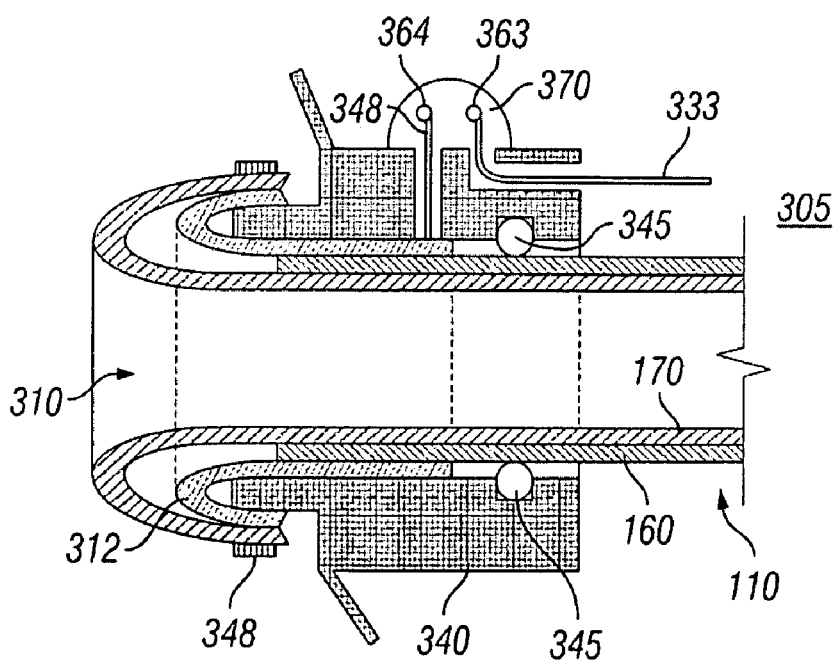
FIG. 4B illustrates another embodiment of the electrically conductive components of the bladder and canister at the bladder deployment port.

FIG. 4B is a further illustration of the electrical connections proximate to the bladder deployment port 310 and illustrates the electrical contact points 363, 364 for connection to the external power source. Also illustrated is the electrical contact of the electrically conductive bladder layer 160 with the open end electrical connector 312 and clamp 348.

Figure 5:
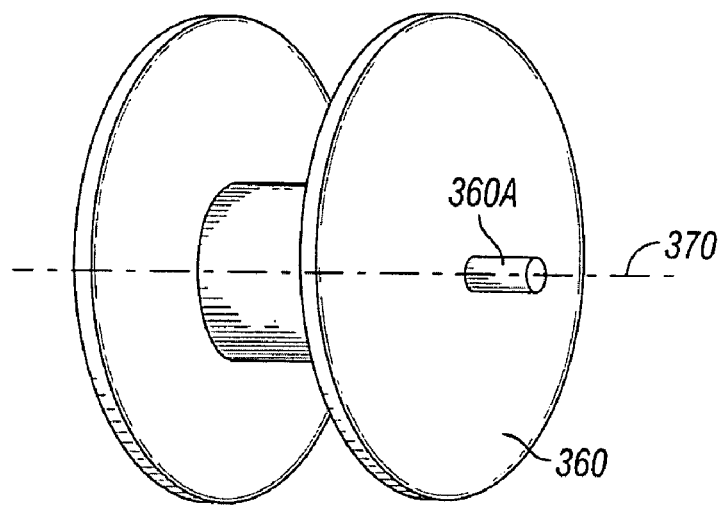
FIG. 5 illustrates a rotatable spool that may be attached to the spindle within the canister. The spool may be used to store, transport and deploy an inverted and deflated bladder.

FIG. 5 illustrates a spool 360 that may be placed within the canister and around which the tether and bladder (with repair material) may be wound. The spool contains a component 360A connective to the spindle (not shown) of the canister. The axis of rotation 370 is also illustrated.

Figure 6A:
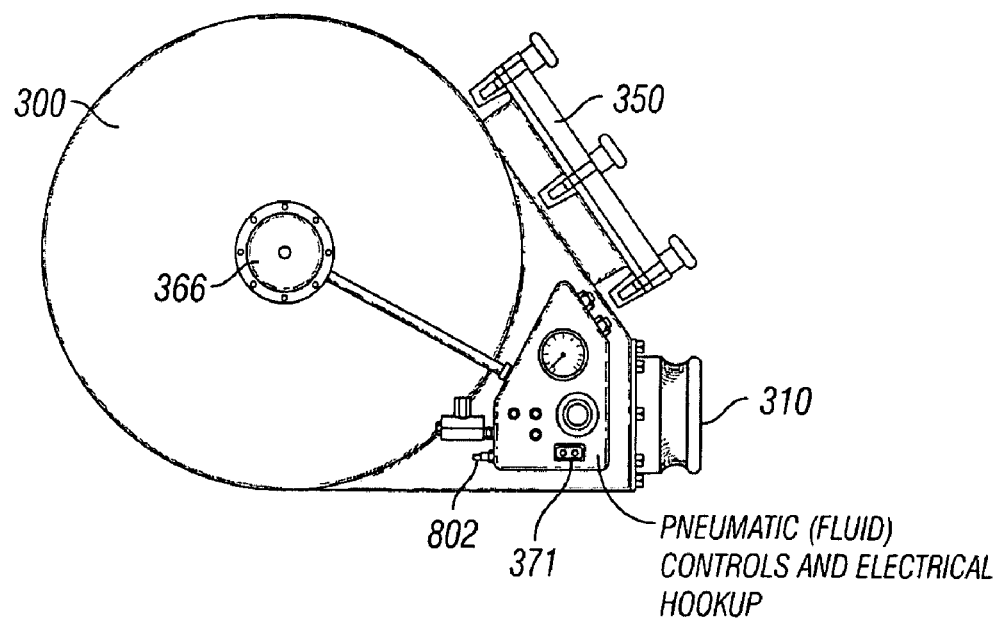
FIG. 6A illustrates a side view of the canister of the invention, including an optional access view port and controls.
Figure 6B:
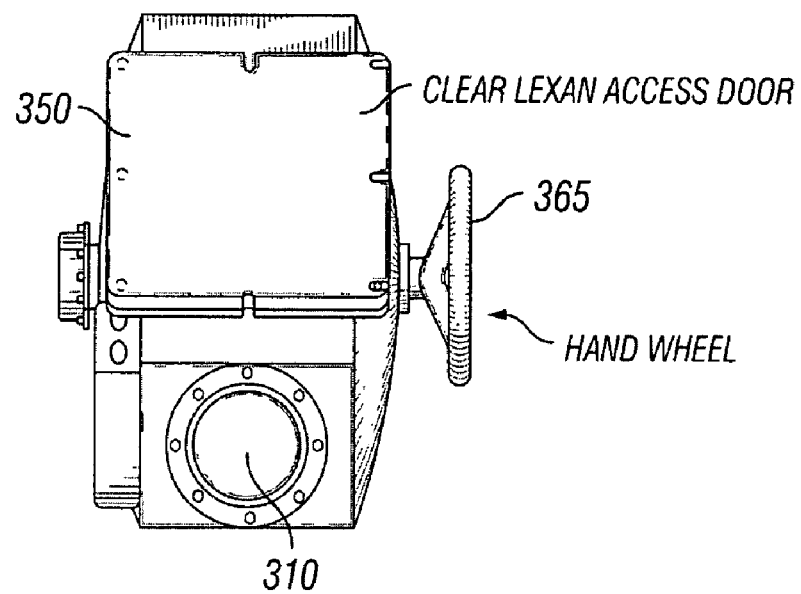
FIG. 6B illustrates a front view of the canister, showing the access view port and the bladder deployment opening. Also illustrated is an optional external wheel to control a rotatable spindle within the canister.

FIGS. 6A and 6B illustrates side and front views of another embodiment of the canister 300 subject of the invention. Included are the bladder deployment port 310 and the access/view port 350. FIG. 6A illustrates the external electrical connector 371 and fluid supply connector 802. A separate fluid outlet is also illustrated. The fluid source or reservoir, pump and fluid conveying tubing or piping is not shown.

Figure 6C:
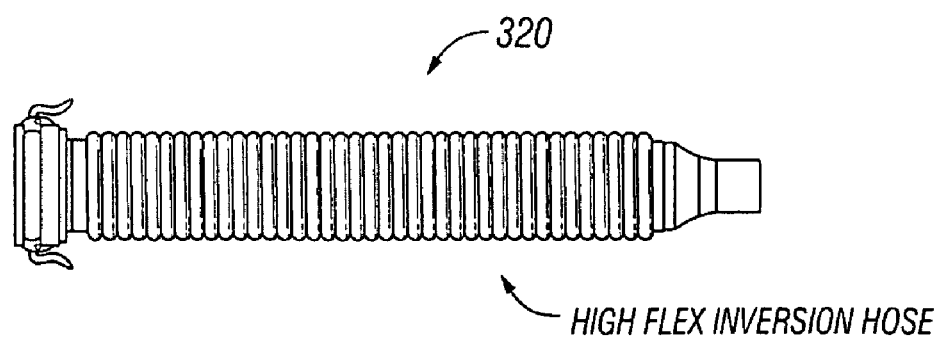
FIG. 6C illustrates an optional inversion hose that may be sealeably attached to the bladder deployment opening of the canister.
Figure 7A:
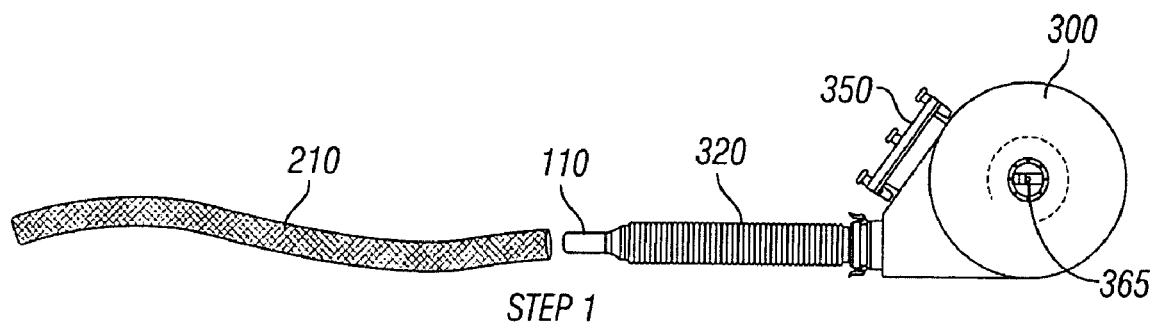
FIG. 7 illustrates a four step process for loading repair material onto the bladder and inversion into the canister.
Figure 7B:
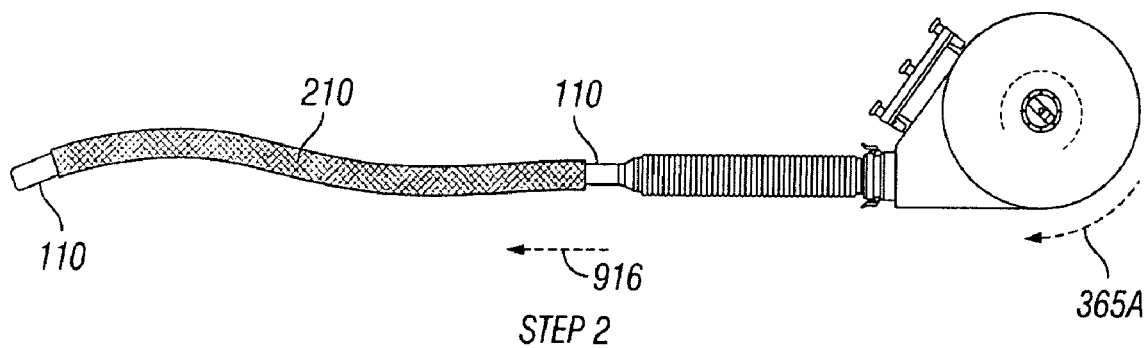
Figure 7C:
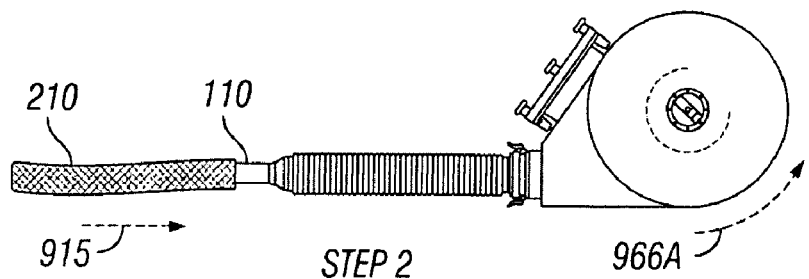
Figure 7D:
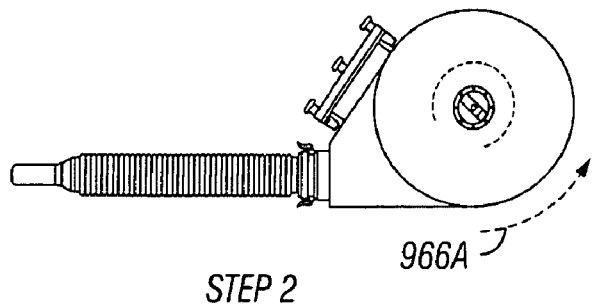

FIG. 6C illustrates the optional inversion hose attachment 320 that may be used to guide the evert bladder from the canister to an open pipe. It may also be used to adjust the effective size of the bladder deployment port for compatibility with the bladder.

FIG. 7, Step 1, illustrates an embodiment of the invention incorporating the canister 300, the inversion hose 320 attached to the canister and a portion of the bladder 110 extending from the inversion hose. It will be appreciated that the bladder extends through the annulus of the inversion hose, the bladder access port and continues into the canister annulus and is spooled about the rotating spindle. The spindle control mechanism 365 is also illustrated. Also illustrated is a second access port 350. The portion of the bladder visible is the outside bladder surface. The portion within the tube and canister is inverted on itself. Also illustrated in Step 2 is repair material 210 that will be placed over the extended outer surface of the bladder.

FIG. 7, Step 2, illustrates the device having the repair material 210 placed over the bladder 110. The closed first end of the bladder is illustrated extending past the repair material. FIG. 7, Step 3, illustrates the start of the retraction process whereby the bladder can be reinserted into the canister 300 through the inversion hose. It will be appreciated that the second open end of the bladder can be connected directly to the canister in a manner similar to the inversion hose. In other words, the use of an inversion hose is optional.

In the preferred embodiment, the retraction (inverting) process incorporates use of a tether (not shown) attached to the inside of the bladder and proximate to the closed first end of the bladder. The second end of the tether is attached to the rotating spindle controlled by the wheel 365. In other embodiments of the invention the second end of the tether may be attached to a spool that turns on the spindle.

As part of the retraction process shown in Step 3, the fluid pressure within the canister and bladder is reduced. This process can be facilitated by creating a negative pressure within the canister by use of a vacuum pump. The retraction is shown by vector arrow 915, in conjunction with turning of the spindle control wheel 365 as shown by vector arrow 966. As the bladder is retracted, it is inverted with the outer surface and repair material being placed in the inside of the collapsed bladder.

FIG. 7, Step 4, illustrates the canister 300 and inversion hose 320 with a portion of the inverted bladder 110 visible at the end of the inversion hose. The bladder may be connected at this end of the inversion hose. When in this position, the device is ready for deployment of repair material into a pipe.

Figure 8A:
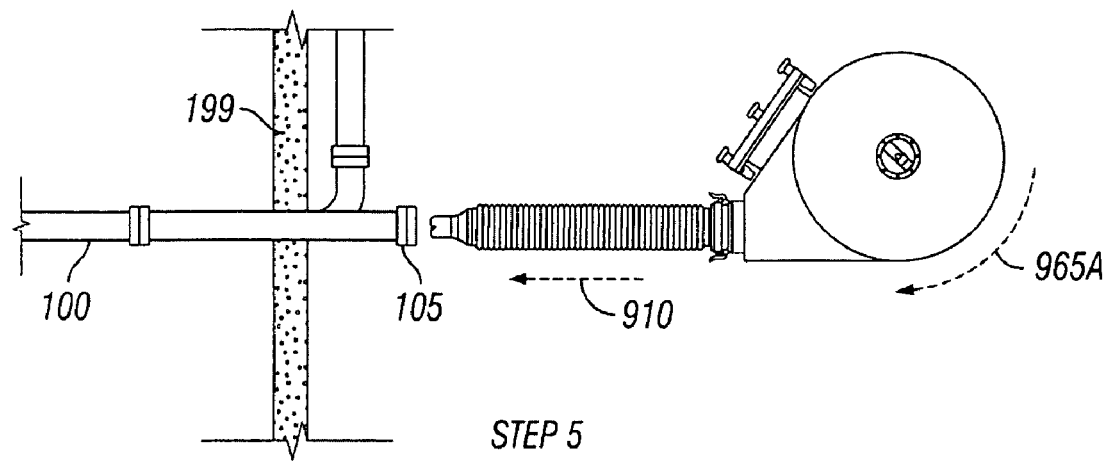
FIG. 8 illustrates a 3 step process of reverting the bladder and deployment into an open pipe, along with repair material and the subsequent inversion and retraction of the bladder into the canister.
Figure 8B:
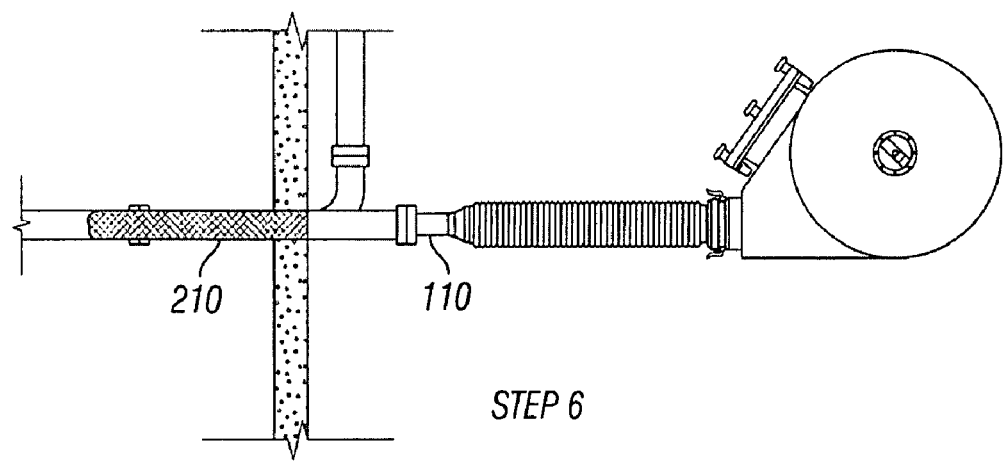
Figure 8C:
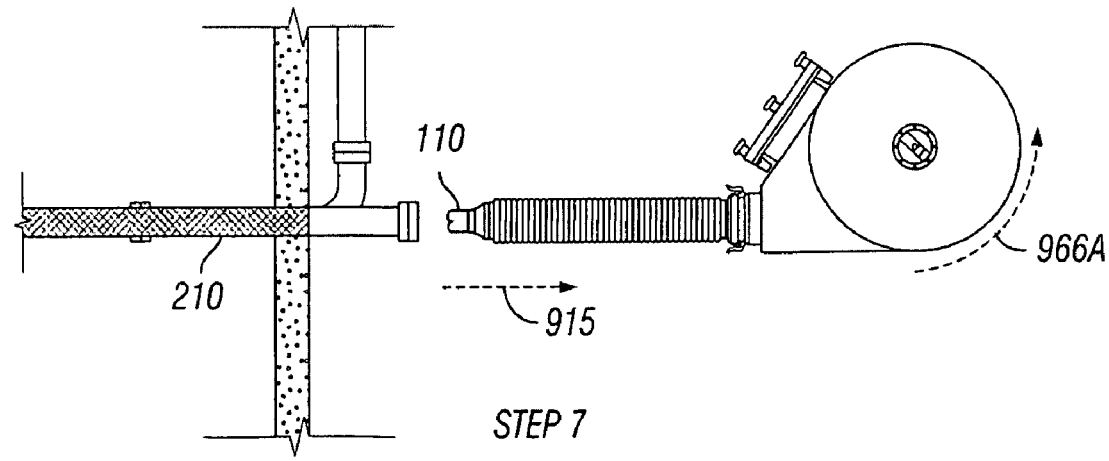

FIG. 8, Step 5 illustrates the placement of the device, comprising the canister 300, optional inversion hose 320 and bladder 110, proximate to an opening 105 of a pipe 100. Step 5 illustrates an application wherein the pipe 100 extends through a wall 199, such as a foundation or basement wall. The portion of the pipe to be repaired may be buried in the ground below the ground surface. The pipe also be inside walls of a structure or similarly inaccessible. The bladder, containing the repair material (not shown), is inserted into the pipe by placing the inversion hose proximate to the pipe opening.

It will be of course appreciated that the sizing of the bladder and repair material diameter, as well as the diameter of the inversion hose, relative to the inside diameter of the pipe will be important to proper deployment. The inversion hose end will preferably inserted into the pipe. The fluid pressure is then increased within the fixed volume of the canister. The increasing pressure will force the inverted bladder proximate to the inversion hose end to push outward (vector arrow 910) to create a larger volume within the bladder annulus. The combined canister and bladder are fluid sealed. Stated another way, the internal volume of the closed canister-bladder system is increased in response to the increasing fluid pressure. This expansion can be facilitated by the spindle control mechanism 365 being turned, as shown by vector arrow 965 (opposite the direction 966 for bladder retraction in FIG. 7, Step 3). This will loosen the collapsed bladder and tether spooled around the spindle and permit the bladder to evert and extend from the canister.

FIG. 8, Step 6 illustrates a continuation of this process, with the repair material 210, now on the outside surface of the bladder, extending into the pipe. Radial expansion of the bladder from fluid pressure may press the repair material to the interior pipe wall surface. When the bladder and repair material are deployed to a desired distance within the pipe, electrically conductive components (not shown) within the bladder can be energized with electric current. This will create the resistive heat that can cure the heat responsive resin. Upon completion of this cure process, the bladder can then be removed from the pipe.

FIG. 8, Step 7 illustrates the preferred method of removal of the bladder from the pipe. The removal step is the same as illustrated in FIG. 7, Steps 2 through 4, but the pipe repair material 210, now cured, remains in a rigid or fixed position pressed against the inner pipe wall surface. The repair material creates an internal liner to the existing pipe.

Figure 9:
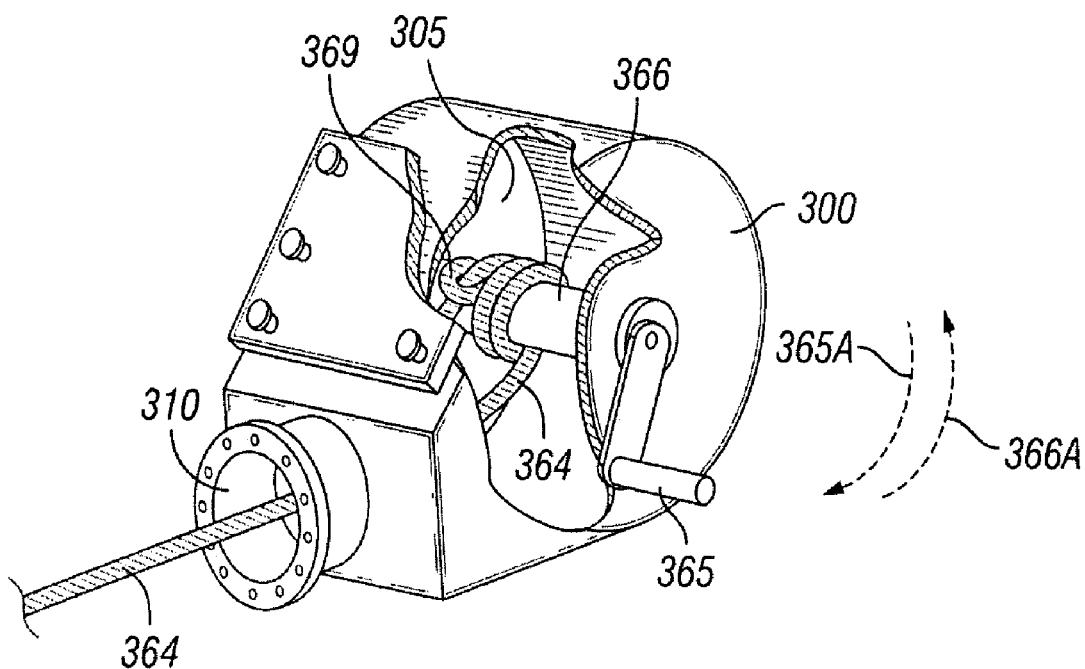
FIG. 9 is a perspective illustration of the canister and canister annulus. Also illustrated is the tether extending from the bladder deployment port and wound around the spindle inside the annulus. Also illustrated is an external crank mechanism that can rotate the spindle.

FIG. 9 illustrates the rotating spindle 366 within the canister 300. Also illustrated is the annulus 305 of the canister for storing the spooled tether 364, as well as the deflated and inverted bladder on which repair material has been installed (not shown). FIG. 9 also illustrates the tether 364 exiting through the bladder access port 310 and the canister attachment sub-component 340. The tether is attached to the inside surface of the bladder proximate to the closed bladder end (not shown). FIG. 9 illustrates the second end of the tether is attached 369 to the spindle. Winding or spooling of the tether onto the spindle will cause the closed end of the bladder, being most distant from the spindle, to be inverted and pulled through the bladder, an inversion tube if used, and the bladder deployment port and onto the rotating spindle. It will be appreciated that it may be desirable to maintain a positive pressure to prevent the remaining portion of the bladder from collapsing and hindering the movement of the inverted portion of the bladder as it is pulled by the tether onto the rotating spindle and spooled within the canister. A simplified crank mechanism is illustrated as the spindle control mechanism 365 and is attached to the spindle at the exterior of the canister. It will be appreciated that other devices for powering and controlling the rotation of the spindle may be used.

FIG. 9 also illustrates that rotating the crank, and thereby the spindle, in the direction of vector arrow 966 will cause the bladder to be pulled into the canister. Turning the crank in direction of vector arrow 965 may facilitate the deployment of the bladder in response to increasing fluid pressure.

FIGS. 10A through 10F illustrate the preferred embodiment of loading the repair material onto the bladder and retraction into the canister. The repair material is illustrated in as a collapsed tubular liner 210 that is festooned on a surface prior to inversion into the retracting and inverting bladder. The deployment of the bladder, beginning is FIG. 10A utilizes the addition of fluid into the canister annulus through connector hose 801. The additional of fluid into the fixed volume of the canister increases the fluid pressure. In response to the increase pressure, the flexible and inflatable bladder begins to be everted out from the canister via the bladder deployment port. This process has been explained in relation to FIG. 7, Steps 1 & 2. The movement or extension of the bladder is indicated by vector arrow 916 in FIG. 10B.

When the extending bladder reaches the festooned repair material, an end of the repair material can be "tucked" into the "puckered" exposed end (See 110A illustrated in FIG. 10D) of the everting bladder 110. The bladder can then be retracted, i.e., inverted. It will be appreciated that the repair material will be pulled along with the inverting bladder. It will be further appreciated that sufficient length of the bladder will have had to have been deployed to permit all of the repair material to be retracted and spooled into the canister. In other words, the length of the deployed bladder in FIG. 10C must be equal to the length of the festooned repair material. The repair material will be used to line the pipe.

Figure 10A:
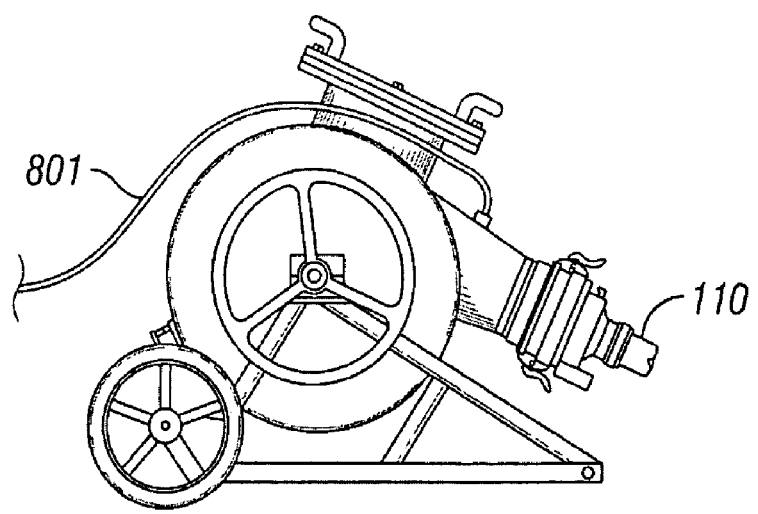
FIGS. 10A through 10F illustrate the preferred embodiment of loading the repair material onto the bladder and retraction into the canister. The repair material is illustrated in as a collapsed tubular liner that is festooned on a surface prior to inversion into the retracting and inverting bladder.
Figure 10B:
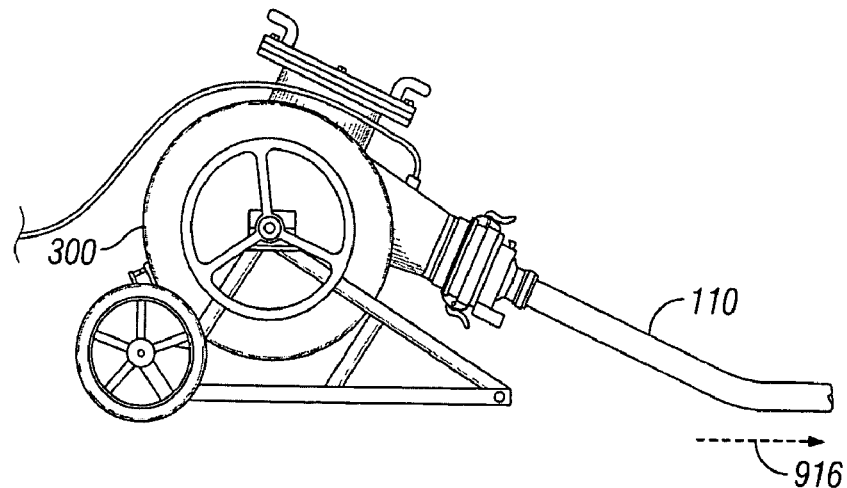
Figure 10C:
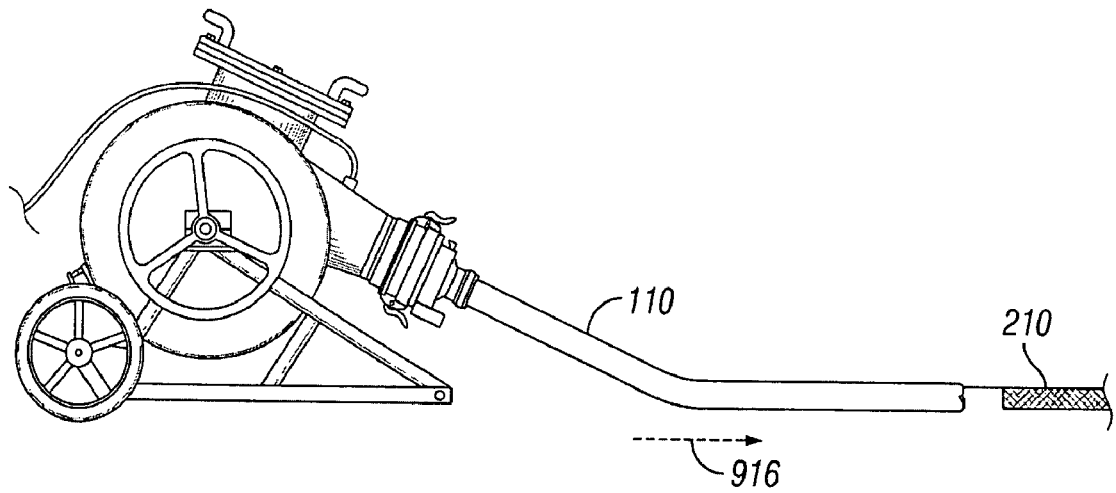
Figure 10D:
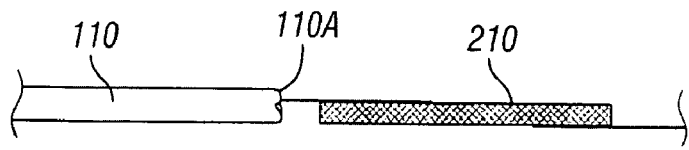
Figure 10E:
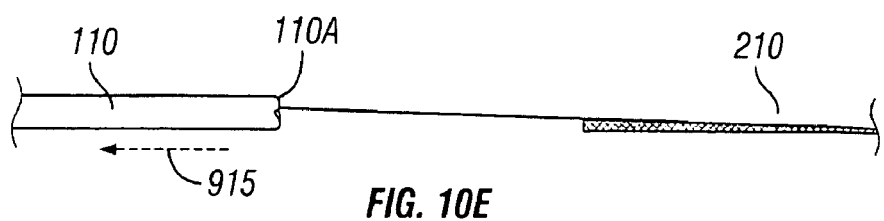
Figure 10F:
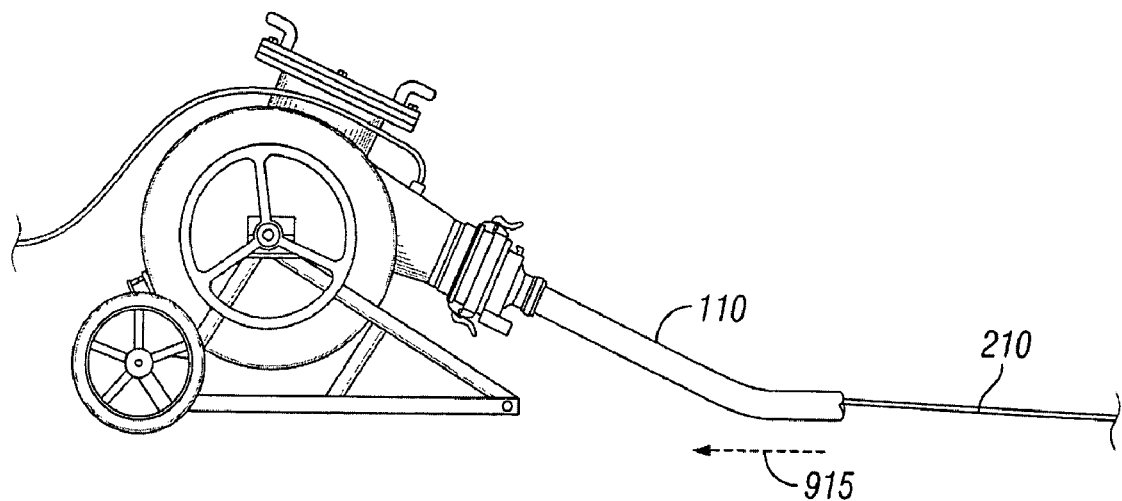

FIGS. 10D and 10E illustrate the continuation of this process with the repair material being pulled into the canister (not shown) as the bladder is retracted (vector arrow 915). See also FIG. 10F.

Figure 11:
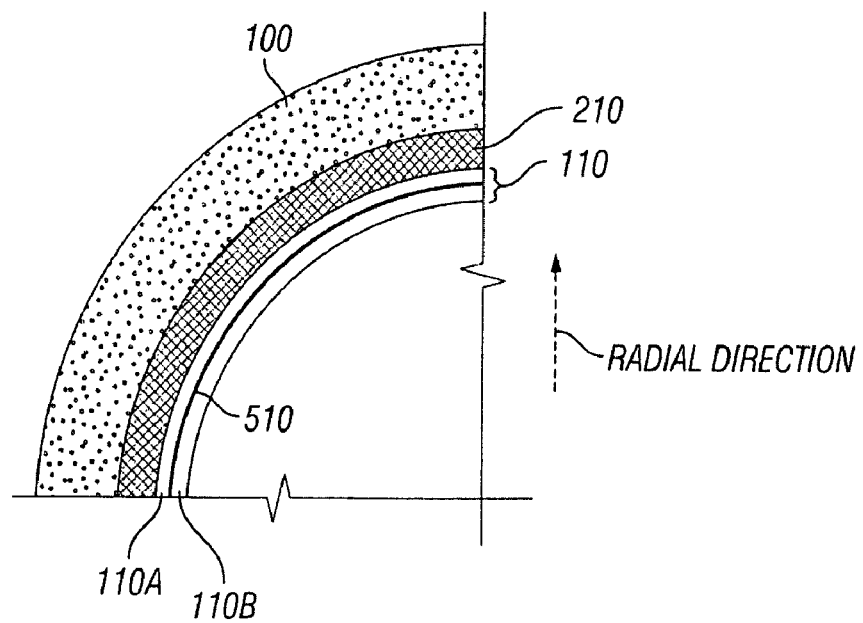
FIG. 11 is a cross section illustration of pipe with the repair material/liner pressed against the inside pipe surface and a multilayer bladder. The radial orientation of the tubular bladder is also illustrated.

FIG. 11 is a cross section illustration of pipe 100 with the repair material/liner 210 pressed against the inside pipe-surface. Also illustrated is a multilayer bladder wherein the inner layer 110B is a fluid impermeable layer, and preferably not electrically conductive and a relatively poor thermal conductor. Silicone is used in the preferred embodiment. This layer is also illustrated in FIG. 4A (see call out 160). The bladder also contains an electrically conductive layer 510 (see FIG. 4A call out 170). In the preferred embodiment, this layer is comprised of braided carbon fibers. The bladder also comprises a third layer 110C, being another layer of silicone. In the preferred embodiment, however, this layer of silicone is not as thick as the inner layer 110B.

FIG. 11 also illustrates the radial orientation (vector arrow) of the assembly. In one embodiment, the bladder has the ability to radially expand in response to the fluid pressure to compress the repair liner against the interior pipe surface.

Figure 12:
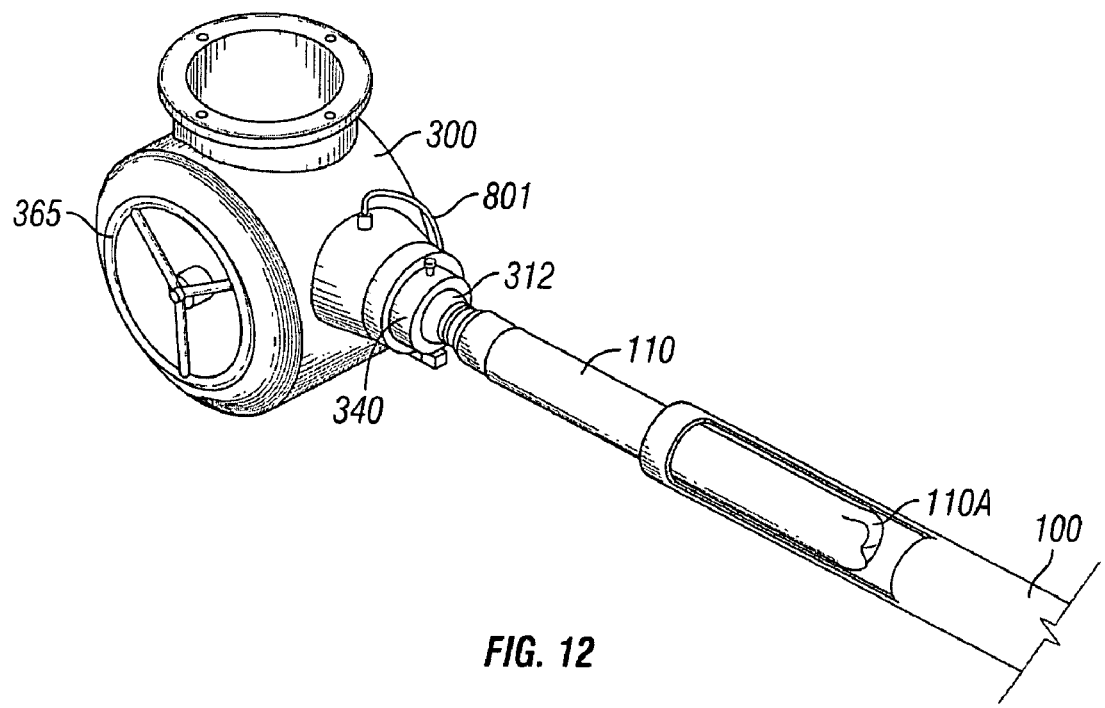
FIG. 12 is a perspective illustration of the canister and bladder extending from the canister deployment port into a pipe.

FIG. 12 is a perspective illustration of the canister 300 and bladder 110, wherein the bladder is shown extending into the interior diameter of a pipe 100. Note the "puckered" end 110A of the bladder. The bladder is extending from the bladder deployment port through the open end electrical connector 312 and the outer connector 340. In the preferred embodiment, the open end electrical connector is covered with an insulating material.

Figure 13:
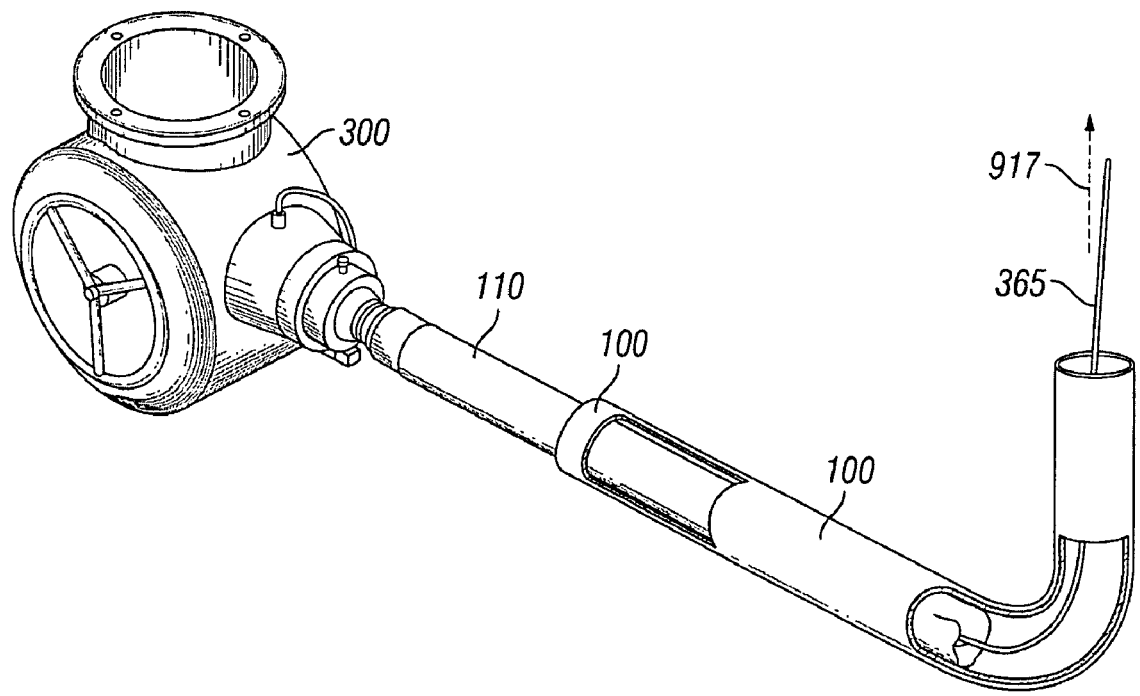
FIG. 13 illustrates the use of an guide or control tether with an everting bladder.

FIG. 13 illustrates the canister 300 and bladder 110 combined with an optional guide or control tether 365. The guide tether may be pulled from a separate pipe access point (not shown) in the direction of vector arrow 917. This pulling motion can assist the everting bladder traversing through pipe bends or corners. Note the tether is extending from the puckered end of the bladder, similar to the retraction of repair material into the inverting bladder as discussed in FIGS. 10A through F.

Figure 15A:
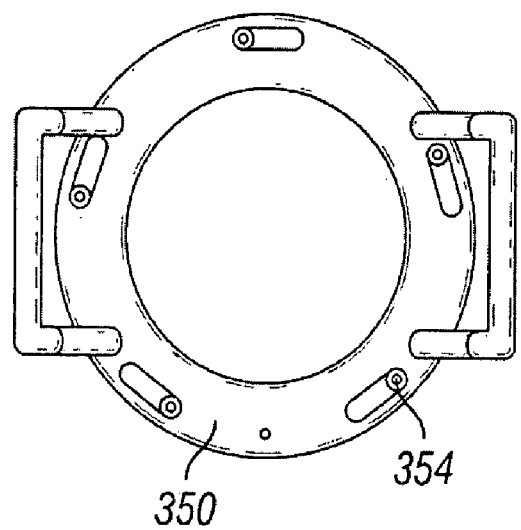
FIGS. 15A and 15B illustrate a top view of the canister view/access port showing the twist locking mechanism of the preferred embodiment. Illustrated is the port cover in an unsealed and sealed postion.
Figure 15B:
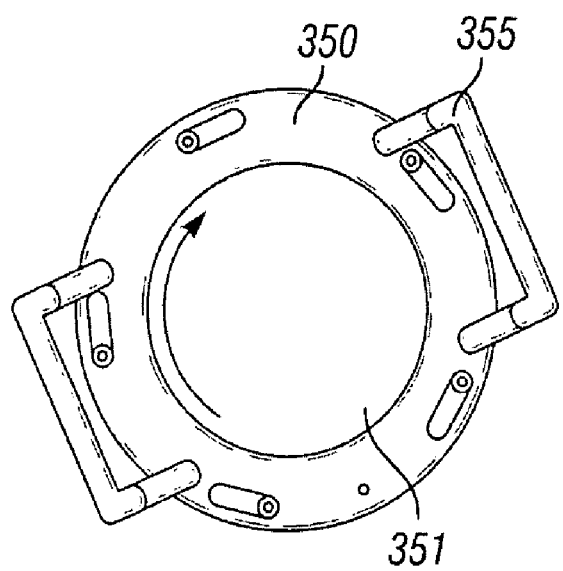

FIGS. 15A and 15B illustrate a top view of the canister view/access port 350 showing the twist locking mechanism of the preferred embodiment. Illustrated is the port cover in an unsealed and sealed postion. FIG. 15B illustrates the unsealed position and the direction (vector arrow) of movement to lock and seal the cover into place. The center of the cover is a clear "bullet-proof" polycarbonate 351. The cover includes handles 355 for lifting and rotating the cover.

Figure 16A:
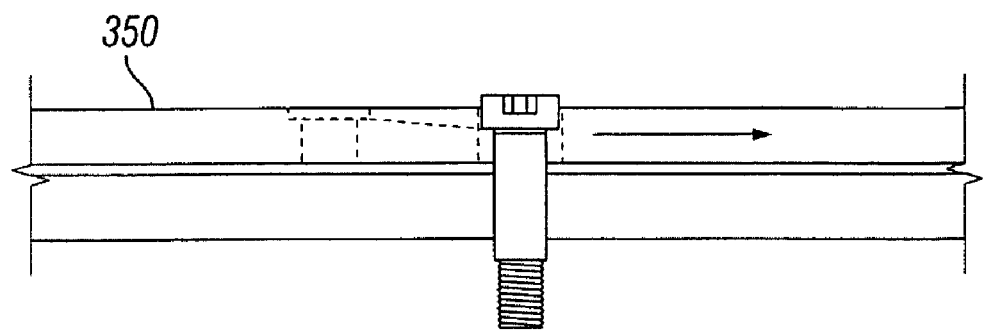
FIGS. 16A and 16B illustrate side views of the twist locking view/access port, including the action of the locking nut head with the beveled surface of the twist locking port cover.
Figure 16B:
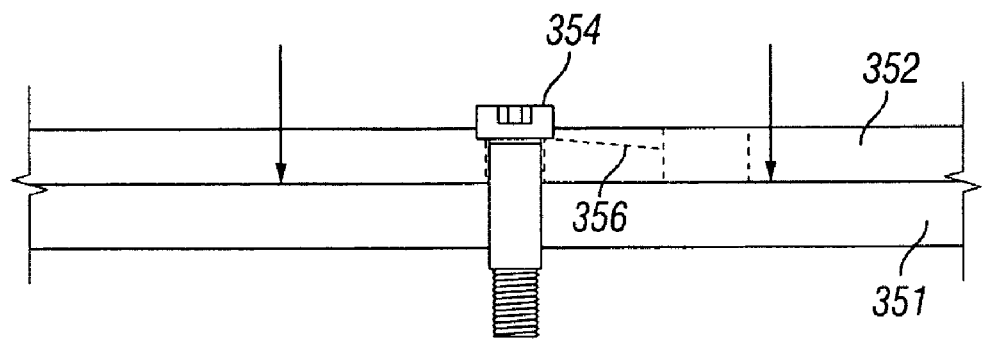

FIGS. 16A and 16B illustrate side views of the twist locking view/access port, including the action of the locking nut head 354 with the beveled surface 356 of the twist locking port cover. FIG. 16B illustrates the downward pressure (vector arrows) when the cover is twisted to the sealed position.

Figure 17:
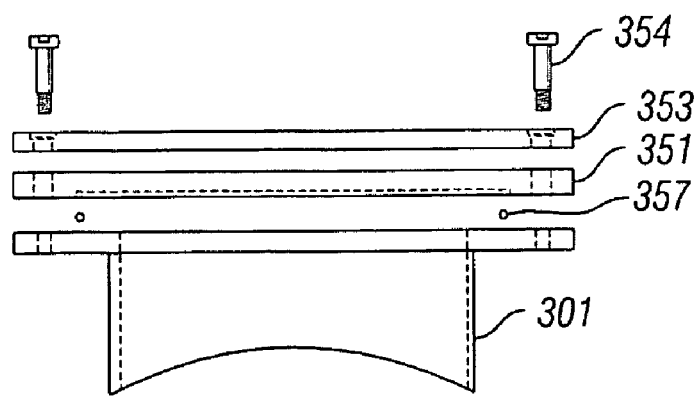
FIG. 17 illustrates an exploded side view of the twist lock cover showing the counter part flange component of the canister, the clear "bullet proof" polycarbonate with a compressible "o-ring" and the locking frame.

FIG. 17 illustrates an exploded side view of the twist lock cover showing the counter part flange component 301 of the canister, the clear "bullet proof" polycarbonate 351 with a compressible "o-ring" 357 and the locking frame 353.

In one embodiment of the invention, placement of the spools into the canister annulus may be achieved by use of a two part canister. The canister parts may be hinged together forming a "clam shell" type component. The two portions will fit together to form a fluid tight seal. When open, however, a spool containing a wound bladder may be removed and replaced with a spool containing a wound bladder carrying repair material ready for installation. The spool can be connected to the spindle so that the spool and bladder may be rotated within the annulus. The second tether end may be either attached to the spool or to the spindle.

Figure 14A:
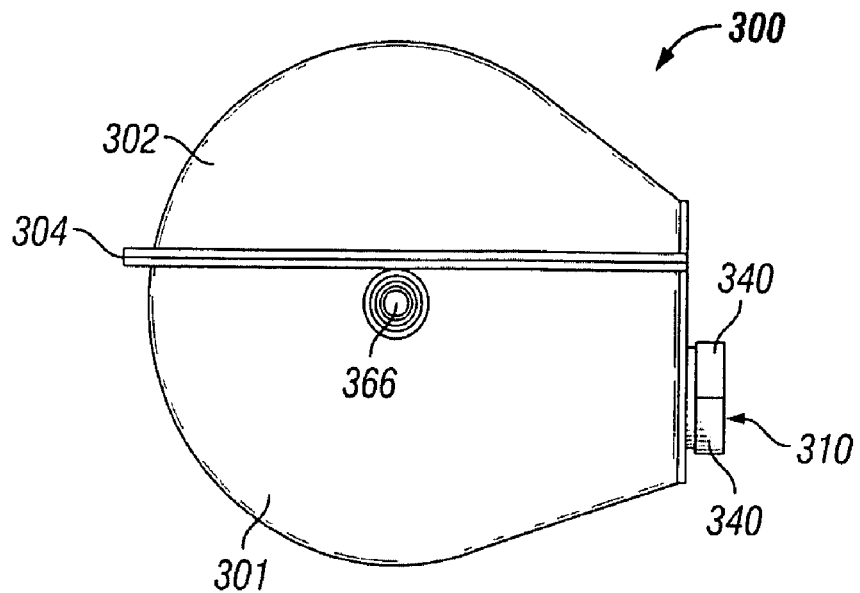
FIGS. 14A and 14B illustrate a two part canister configuration for accessing the canister annulus and placement and removal of spools that may contain deflated and wound bladders.

FIG. 14A illustrates a side view of the clam shell type canister 300 of the invention. The canister illustrated in this embodiment is comprised of a top component 302 and a bottom component 301. The two components may be hingeably mounted (not shown). The two components may be placed together forming a fluid tight junction 304. Also illustrated is the spindle mechanism 366 attachable to a rotatable spool (not shown) within the interior annulus of the canister. Also illustrated is the bladder deployment port 310. This port provides access to the annulus of the canister and the rotatable spool (not shown). Part of the bladder access port is an attachment mechanism 340 for sealably attaching the open bladder end (not shown). Also illustrated is the rotatable spindle attachment mechanism 366 attachable to a removable spool (not shown) that can be installed inside the canister.

Figure 14B:
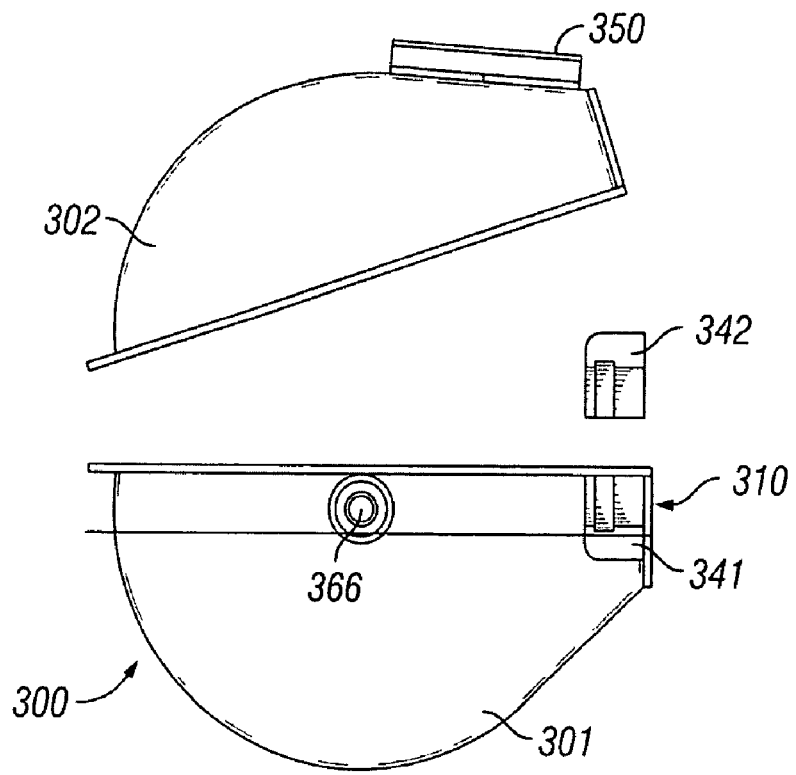

FIG. 14B illustrates to the segments 301, 302of the canister separated for clarity of illustration. FIG. 14B also illustrates another embodiment of the bladder-canister attachment component 340 of the invention. The canister 300 may include a hinged two part connector 341 342 connection that is in electrical communication with a cylindrical and electrically conductive component (not shown). A clamp presses the electrically conductive layer 160 of the bladder into electrical contact with the open end electrical connector. In this embodiment, the attachment mechanism is within the lower fluid sealable portion of the canister and comprises two hingeably attached subcomponents 341, 342. The electrical connector components described elsewhere in this disclosure may be used.

In a preferred embodiment, the canister is made of lightweight aluminum with domed construction for efficient distribution of fluid pressure. In another embodiment, a control panel 360 permits monitoring and control of fluid pressure within the canister (and bladder), electrical power. An example of the control panel is illustrated in FIG. 6A. The control panel may also permit monitoring of the bladder temperature or the temperature of the repair material. The preferred embodiment may also include a mechanism (not shown) to control or monitor the length of bladder deployed from the canister. It will be appreciated that the control mechanism may be separately located from the canister.

In the preferred embodiment, the canister is mounted on a frame with a pivot mechanism. This structure permits the canister to be rotated about an axis, thereby enabling the orientation of the bladder deployment port to be changed. This fame and rotation is illustrated in FIG. 1B. FIG. 1B illustrate the canister 300, bladder deployment port 310, access/view port 350, frame 387, rupture disk 386, pivot mechanism 388, and frame wheels 389. Also illustrated are the fluid port 802, the outer connector 340, open end electrical connector 312 and the spring latch pin 384.

Figure 18:
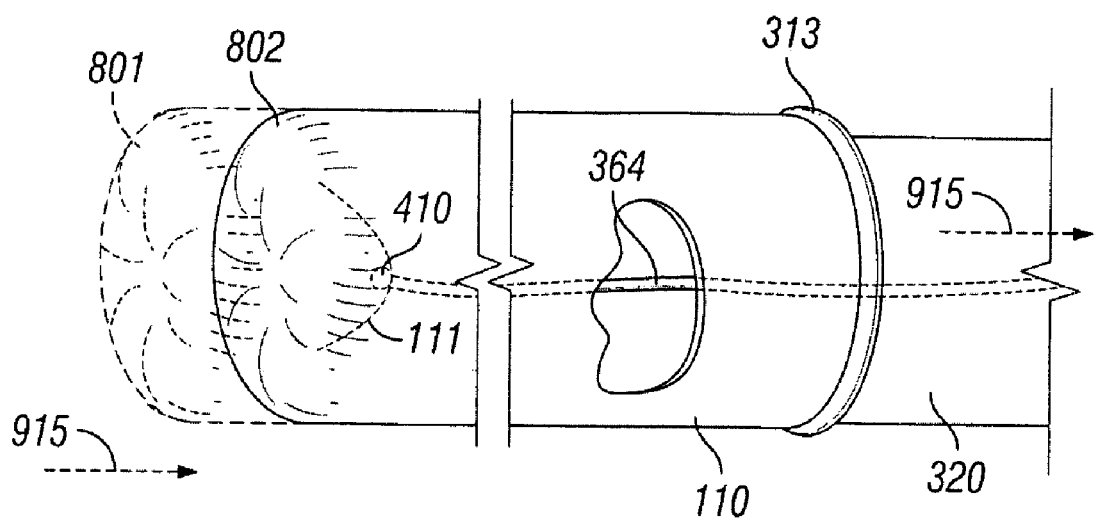
FIG. 18 illustrates the bladder extending from the canister, including a tether connecting the inside of the bladder to the rotatable spindle.

FIG. 18 illustrates a cross sectional view of the closed bladder end 111 attached to the first tether end by a mechanism 410 within the inside of the bladder 110. It will be appreciated that the second tether end is attached to the rotating spindle (not shown) as illustrated in FIG. 9. Combining the discussion with FIG. 9, turning the spindle control mechanism 365 in the direction of vector arrow 966 will cause the tether to move in direction of vector arrow 915 in FIG. 5A. Of course, this will simultaneously pull the connection 410 and the closed bladder end 111 in the same direction, thereby causing the extended or deployed bladder length to decrease and to change from a first position 801 to a second position 802. Also illustrated in FIG. 18 is the mechanism 313 connecting the bladder to an inversion tube 320.

Figure 19:
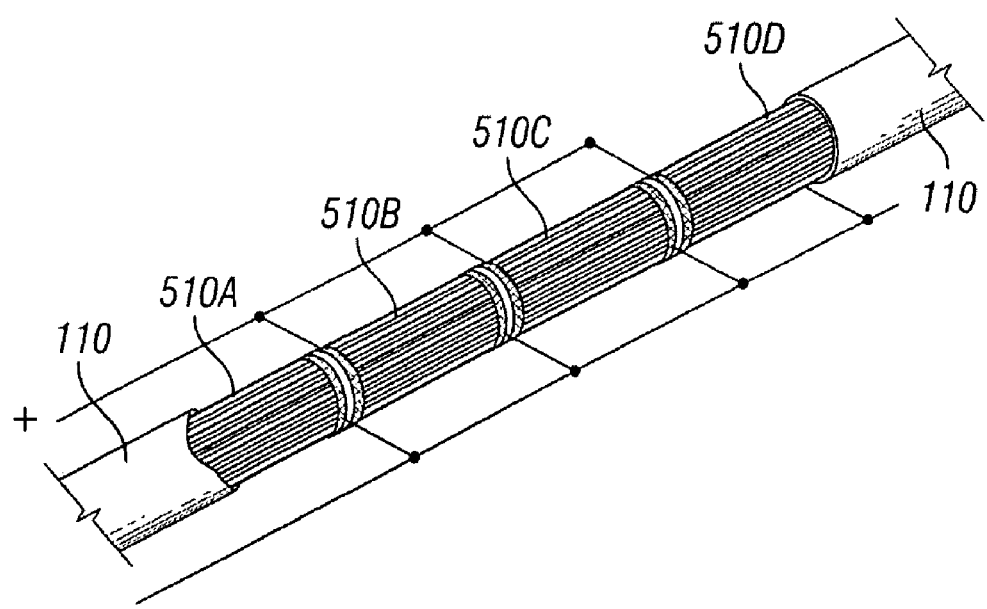
FIG. 19 illustrates an embodiment of the bladder of the invention wherein the bladder is comprised of multiple electric heating circuits.

FIG. 19 illustrates an alternate embodiment comprising multiple electric circuits 510A, 510B, 510C and 510D within the bladder 110. Each circuit can be separately controlled or energized. The invention is not limited to four circuits. Further, a circuit path is not required to incorporate the entire circumference of the cylindrical shaped bladder. In deed, in one embodiment, differing arc segments of the circumference may contain separate circuits. FIG. 19 illustrates longitudinal orientation of the separate circuits The circuit illustrated in FIG. 19 also includes connective means to convey electrical power through the extended and inflated bladder, and the canister. Various means for such connection are known to persons skilled in the technology. It will be appreciated that the conductive material is not required in all parts of the bladder. Preferably, the region proximate to the closed bladder end will contain the heating component material. As previously mentioned this electrically conductive circuit contained as part of the bladder, will supply resistive heat that can be used for activation of the resin in a curing reaction. Also, the fibers may be place as an additional "outer layer" to the bladder, in contrast to being embedded radially distant from the outer surface. Placement in an outer layer configuration will of course enhance heating and power efficiency.

The bladder heating component may be carbon or graphite fibers or filaments. The conductive materials may be braided fibers, yarns or woven tapes. Other examples include hybrid fibers containing filaments of conductive material combined with other materials such as polyester, teflon, etc. Such a combination may provide enhanced strength and flexibility for repeated inversions and inflation of the bladder.

The following paragraphs describe one embodiment of the method taught by the invention.

One step of the method for loading the repair material is everting or extending the bladder from the canister. The step may include the application of a fluid pressure to the interior canister annulus and bladder annulus. The pressure operates on the inflatable bladder This fluid pressure can be regulated through the use of electro-pneumatic regulators. Pressure sensing can be accomplished by sending units located within the canister annulus. The force required during this step in minimal and sufficient to cause the bladder to inflate.

Step 1. Unroll pre-impregnated repair material in preparation for loading into Canister. The repair material is to be placed over the exterior surface of the extended bladder. A staging area equal to the length of the repair is needed. This "loading" procedure can be performed off-site. Stable resin matrix allows up to 8 hours of "out-time" in cool conditions.

Step 2. Hook-up fluid supply and set pneumatic controls to "Load". The inflation heating bladder is everted from the canister and extending into repair material (which may comprise an open ended tubular shape). The spindle control hand wheel can be used to control speed and length of bladder deployment.

Step 3. With bladder fully extended through the length of repair material, set pneumatic controls to "Retract". The end of the repair material is tucked into the inverting face of the bladder, and is pulled into the bladder as it is spooled back into the canister.

Step 4. With the bladder and repair material completely contained in the Canister, set pneumatic controls to "Exhaust". Any residual fluid pressure is relieved. The system is now ready for storage, transportation or insertion.

Step 5. Position the end of the inversion hose at the service access point of the pipe. Loading procedures determine where the repair material will actually begin to unfurl. Stated another way, the repair material can be loaded onto various locations of the extended bladder. This can be especially useful when inserting through clean-outs, tee's and wye's. A consumable temperature probe can be inserted into the host pipe or contained within the repair material to provide feedback to the power controls (not shown).

Step 6. Set pneumatic controls to "Install". The rate or speed of the bladder being everted from the canister is controlled via the hand wheel and pressure is monitored and maintained. Footage counter may monitor the length of the bladder extending out from the canister and thereby indicate location of the repair material within the pipe. Connection to an electrical power supply is accomplished through a receptacle component (not shown). A temperature sensor may be connected to the power control unit. Electrical power to the resistive heating component of the bladder may be regulated by an electronic controller. This will thereby control the heat curing of the resin impregnated repair material within the pipe. Complete cure is indicated on the power control unit and may be accomplished in less than two hours.

Step 7. With cure complete, set pneumatic controls to "Retract" and using hand wheel, invert the heating inflation bladder back into the canister. The repaired pipe may be returned to service.

As illustrated in FIG. 9 the bladder construction contains an internal tether 364 that can be permanently attached to the interior of the bladder at fitting 410 and may be removably attached to spindle 366 within the canister. To invert the bladder and repair material into the canister for safe transport to the repair location, the tether is wound about the spindle causing the bladder to retract.

By introducing pressure to the canister annulus, the bladder and repair material are caused to be everted from the canister and extended into a pipe. In a preferred embodiment, increasing the fluid pressure may causes at least a portion of the tubular or cylindrical shaped bladder to radially expand to press the repair material to the inside geometry of the pipe.

The bladder is constructed of a temperature resistant material. The bladder also contains an electrically heating component. The component is comprised of electrically conductive fibers that resisitively heat when an electrical current passes through the fibers. The heating component is preferably located proximate to the outer surface of the everted/extended bladder. The material surrounding the conductive fibers is a flexible, resilient substance such as silicone, fluorosilicone or fluoropolymer. Electrical wires conduct the electrical energy from remotely stationed, controllable power supplies to the electrically conductive fibers of the heating component. Heating temperatures produced range from 200° F. to 400° F. depending on the curing requirements of the resin matrix selected for use in the repair material. These temperatures can be achieved in as little as 10 minutes enabling an extremely fast cure cycle.

The bladder may be detachable from the canister or inversion tube to facilitate replacement or to switch to a bladder of different length and/or diameter. When the desired temperatures have been achieved and cure cycle complete, the apparatus can be removed from the pipeline and loaded again with repair material for an additional repair. With the ability to quickly produce and control heat, multiple repair installations are completed in a short time frame.

After installation and cure of the repair material, the bladder component can be removed from the pipeline. The removal steps include first turning off or removing electrical power from the conductive fibers in the bladder. Next, the pressurized interior of the canister and bladder is reduced and can be introduced to a vacuum. In one embodiment, a venturi type vacuum pump which produces vacuum from a pressurized air supply can be housed with the canister. Electropneumatic solenoid valves located with the canister to switch the supply of pressurized fluid from delivery to the canister annulus and be redirected vacuum pump. This application of vacuum quickly and completely evacuates all fluid from within the bladder and causes the bladder to collapse on itself, releasing contact from the completed repair material and the interior surfaces of the pipe. Continued application of vacuum may also facilitate the retraction (inversion) of the bladder into the canister.

The bladder is spoolable, meaning that it can be wrapped around and stored on a rotating spool connectable to rotating spindle mechanism within the canister annulus. The bladder is generally cylindrical or tubular, and has a length, a diameter, and a thickness. The bladder may be formed from a plurality of flexible layers. The bladder contains electrically conductive fibers that when energized with an electric current, resistively heat the bladder and repair material.

A preferred embodiment of the device subject of the invention includes a canister body constructed of Type 7075 Aluminum "aircraft alloy" for exceptional strength and low weight. Built to ASME standards for pressure vessels with a 100 PSI rating, the canister can hold up to 50' of the heatable and inflatable bladder and repair material.

The inversion hose can be made of high flex material with quick release coupling. Couplings of this type are illustrated in FIGS. 6A and 6C. The inversion hoses can be in differing lengths and selected based on the repair location and pipe access. Interchangeable reducer couplings may be used to accommodate 3" thru 6" repairs.

A preferred embodiment includes the access port 350 illustrated in FIGS. 15 through 17 may comprise a clear Lexan® "bullet proof" access door and viewing window with hand knob fasteners. The spindle control component 365 illustrated in FIG. 3A may be a durable, cast aluminum hand wheel for material loading and inversion control. The wheel may be a fold-down handle to facilitate transport and storage.

A sealed, NEMA Type 3 slip ring assembly may also be used in another embodiment for the continuous transfer of electrical energy to the bladder. The device can include pneumatic controls, including air supply hook-up, self-relieving regulator, both mounted and remote pressure sensing, air logic switching and safety pop-off valve with air release. Twist-lock power supply hook-up assembled in accordance with NEC specifications and electrical circuits having GFI protection may also be utilized. Other embodiments can include 110/220 volt input power supply with thermocouple feed-back and digital control. Low voltage, direct current output can also be utilized.

The preferred embodiment of the invention includes the ability to monitor the temperature of the bladder wall. This monitoring can, of course, be combined with varying the power level to accurately maintain a desired heat level at differing sections of the bladder in conjunction to the repair material and location within the pipe. One method for heat monitoring that is effective in facilitating the cure of different polymer matrix composites utilizes the resistive heating elements located strategically within the actual composite will provide a heat source when coupled to a power supply. The semiconductor device (SCR) that controls current flow from an electrical power source to the resistive heating elements using switching techniques. When the control signal is off, the SCR performs as an open switch and prevents the current from flowing from the SCR to the resistive heating elements. At this time, the impedance of the heating elements can be measured to identify the level of heat production. When the control signal is on, the SCR acts as a unidirectional switch and current can flow to the resistive heating elements in one direction. SCR power controls use three different switching modes; on-off, phase angle and zero-fired. On-off controls replicate the operation of an electromechanical contactor or relay. Phase angle control replicates the operation of variable transformers, providing variable control of the voltage impressed on the load. Because SCRs can be switched on at any time during each half cycle of the AC wave-form, the voltage to the resistive heating elements is infinitely variable from zero to 100%. Phase angle switching will be suitable and desired for control of the heating process disclosed in this application.

The impedance measurement referred to above will be the means for in-process temperature monitoring. A measuring system will be employed to provide a feedback signal to the SCR power supply. The conductive fibers present in the resistive heating elements have a dual purpose. During the "on" cycle of the SCR, these fibers will provide the heat necessary for processing. During the "off" cycle of the SCR, these fibers will be utilized as sensing electrodes to provide information back to the impedance measuring system, and in turn, to the SCR.

A direct correlation exists between the conductivity of the heating elements and temperature that enables an accurate depiction of heat generation to be determined continuously throughout the repair process. In this technique, data from the monitoring will be used as input for Statistical Process Control (SPC). Software can be developed to identify the time at which critical points related to a specific event occur. This in turn will provide feedback to a controller that will send a proportional signal to the SCR.

While specific embodiments have been illustrated and described, numerous modifications are possible without departing from the spirit of the invention, and the scope of protection is only limited by the scope of the accompanying claims.

What is claimed is:

1. An in situ pipe repair bladder storage, transport and deployment device comprising a fluid sealable container having an interior annulus within the container and further comprising
   a rotatable spindle component within a container annulus in communication with a rotating control mechanism outside of the container;
   a. at least one first opening and attachable to an open end of a tubular shaped bladder having a first closed end and second open end wherein the first container opening is dimensioned to permit the bladder to pass through the first opening;
   b. at east one second opening permitting controllable fluid communication between the container annulus and a fluid source; and
   c. an electrical power connecting component to convey electrical current from a power source to an electrically conductive heating component of the bladder; and
   d. an electric control component.

2. The device of claim 1 further comprising a fluid control component.

3. The device of claim 1 further comprising a temperature measuring component.

4. The device of claim 1 further comprising a third sealable opening in the container.

5. The device of claim 1 wherein the rotating control mechanism is a manually operable wheel.

6. The device of claim 1 wherein the rotating control mechanism includes a motor.

7. The device of claim 1 wherein the rotating control mechanism includes at least one gear component.

8. The device of claim 1 wherein the container is a two part closeable and fluid sealable container.

9. The device of claim 8 wherein the two part container is hingeably attached.

10. The device of claim 8 wherein a spool component containing a wound bladder can be placed into the annulus and attached to the spindle component.

11. An in situ pipe repair device comprising:
   a. a fluid inflatable bladder having a tubular shape with a closed first end, an outside surface on which a thermally responsive repair material can be detachably carried, an inside bladder surface, an interior bladder annulus, and a second attachable open end and further comprising:
      i. flexible walls that permit the bladder and repair material to be inverted and wound;
      ii. an electrically conductive component that when energized can resistively heat the bladder wall;
      iii. sub component to attach a first end of a tether component on the inside bladder surface proximate to the closed first bladder end
   b. tether component having an attachable first end and an attachable second end;
   c. fluid sealable container having an interior annulus, and further comprising:
      i. a rotatable spindle component within the interior container annulus and in communication with a rotating control mechanism outside of the container:
      ii a mechanism to attach the second tether end to the spindle;
      iii. at least one first opening attachable to the bladder second open end and dimensioned to permit the bladder to pass through; and
      iv. at least one second opening permitting controllable fluid communication between the container annulus and a fluid source; and
      v. an electrical power connecting component to convey electrical current from a power source to the electrically conductive component of the bladder;
   d. an electric control component.

12. The device of claim 11 further comprising a fluid control component.

13. The device of claim 11 further comprising a temperature measuring component.

14. The device of claim 11 further comprising a third sealable opening in the container.

15. The device of claim 11 wherein the rotating control mechanism is a manually operable wheel.

16. The device of claim 11 wherein the rotating control mechanism includes a motor.

17. The device of claim 11 wherein the rotating control mechanism includes at least one gear component.

18. The device of claim 11 wherein the electrically conductive component of the bladder comprises a plurality of electric circuits.

19. The device of claim 18 wherein the electric current for each circuit can be separately controlled.

20. The device of claim 11 further comprising a fluid pump.

21. The device of claim 11 further comprising a fluid vacuum pump.

22. The device of claim 11 wherein the bladder is comprised of elastomers.

23. The device of claim 11 wherein a detachable repair material is contained on the exterior fluid inflatable bladder surface and is everted with the bladder from the container.

24. The device of claim 23 wherein the repair material comprises a thermally responsive resin matrix.

25. The device of claim 11 wherein the container is a two part closeable and fluid sealable container.

26. The device of claim 25 wherein the two part container is hingeably attached.

27. The device of claim 25 wherein a spool component containing a wound bladder can be placed into the annulus and attached to the spindle component.

* * * * *